United States Patent
Xu et al.

(10) Patent No.: US 11,674,097 B2
(45) Date of Patent: Jun. 13, 2023

(54) UPGRADING OF PYROLYSIS TAR AND FLASH BOTTOMS

(71) Applicant: ExxonMobil Chemical Patents Inc., Baytown, TX (US)

(72) Inventors: Teng Xu, Houston, TX (US); Kapil Kandel, Humble, TX (US); Krystle J. Emanuele, Houston, TX (US); Jeffrey C. Yeh, Houston, TX (US); Giovanni S. Contello, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 258 days.

(21) Appl. No.: 16/972,363

(22) PCT Filed: May 24, 2019

(86) PCT No.: PCT/US2019/033925
§ 371 (c)(1),
(2) Date: Dec. 4, 2020

(87) PCT Pub. No.: WO2019/236326
PCT Pub. Date: Dec. 12, 2019

(65) Prior Publication Data
US 2021/0230490 A1    Jul. 29, 2021

Related U.S. Application Data

(60) Provisional application No. 62/682,197, filed on Jun. 8, 2018.

(30) Foreign Application Priority Data

Jul. 19, 2018 (EP) ........................... 8184473

(51) Int. Cl.
*C10G 69/06* (2006.01)
*B01D 3/14* (2006.01)
(Continued)

(52) U.S. Cl.
CPC ............. *C10G 69/06* (2013.01); *B01D 3/148* (2013.01); *B01J 19/245* (2013.01); *C10G 67/14* (2013.01);
(Continued)

(58) Field of Classification Search
CPC combination set(s) only.
See application file for complete search history.

(56) References Cited

U.S. PATENT DOCUMENTS

| | | |
|---|---|---|
| 7,906,010 B2 | 3/2011 | Keusenkothem et al. |
| 2014/0016095 A1 | 3/2014 | Beech, Jr. et al. |

(Continued)

FOREIGN PATENT DOCUMENTS

| | | |
|---|---|---|
| WO | 2013/033582 | 3/2013 |
| WO | 2015/191236 | 12/2015 |

(Continued)

*Primary Examiner* — Randy Boyer
*Assistant Examiner* — Juan C Valencia

(57) ABSTRACT

Systems and methods are provided for co-processing of pyrolysis tar with pre-pyrolysis flash bottoms. In some aspects, the co-processing can correspond to solvent-assisted hydroprocessing. By combining pyrolysis tar and flash bottoms with a solvent, various difficulties associated with hydroprocessing of the fractions can be reduced or minimized, such as difficulties associated with hydroprocessing of high viscosity feeds and/or high sulfur feeds. Optionally, separate solvents and/or fluxes can be used for the pyrolysis tar and the flash bottoms. The resulting upgraded products can be suitable, for example, for inclusion in low sulfur fuel oils (LSFO).

28 Claims, 7 Drawing Sheets

(51) Int. Cl.
*B01J 19/24* (2006.01)
*C10G 67/14* (2006.01)
*C10L 1/04* (2006.01)

(52) U.S. Cl.
CPC ......... *C10L 1/04* (2013.01); *B01J 2219/0004* (2013.01); *C10G 2300/202* (2013.01); *C10G 2300/205* (2013.01); *C10G 2300/206* (2013.01); *C10G 2300/308* (2013.01); *C10G 2300/4006* (2013.01); *C10G 2300/4018* (2013.01); *C10L 2290/24* (2013.01)

(56) References Cited

U.S. PATENT DOCUMENTS

| | | | |
|---|---|---|---|
| 2014/0061095 A1 * | 3/2014 | Beech, Jr. | C10G 69/06 208/73 |
| 2015/0315494 A1 | 11/2015 | Hanks et al. | |
| 2015/0344790 A1 | 12/2015 | Ferrughelli et al. | |
| 2015/0361359 A1 | 12/2015 | Beech, Jr. et al. | |

FOREIGN PATENT DOCUMENTS

| | | | |
|---|---|---|---|
| WO | WO-2015191236 A1 * | 12/2015 | ............. B01J 8/007 |
| WO | 2018/111574 | 6/2018 | |
| WO | 2018/111577 | 6/2018 | |

\* cited by examiner

UPGRADING OF PYROLYSIS TAR AND FLASH BOTTOMS

CROSS-REFERENCE OF RELATED APPLICATIONS

Priority

This application is a National Phase Application claiming priority to P.C.T. Patent Application Serial No. PCT/US2019/033925, filed May 24, 2019, which claims priority to and the benefit of U.S. patent application Ser. No. 62/682,197, filed Jun. 8, 2018 and European Patent Application No. 18184473.9, filed Jul. 19, 2018, which are incorporated herein by reference in their entireties.

FIELD

The disclosure relates to processes for upgrading mixtures of pyrolysis tar and flash bottoms fractions to a product suitable for blending into fuels, to provide, for instance, a low sulfur fuel oil or an Emission Controlled Area fuel. The disclosure also relates to apparatus useful for carrying out such processes; to the products of such processes, including products containing the processed mixture and/or the upgraded mixture; and to blends containing such products.

BACKGROUND

Steam cracking is a form of pyrolysis that can be beneficial for generating various small olefins, such as ethylene, propylene, and butenes. Such small olefins can then be used in various applications, such as polymer synthesis. Due to the value of the small olefins, it can be beneficial to use a whole or partial crude as the feedstock to a pyrolysis process. When a whole or partial crude is used as a feed, the product slate from steam cracking and/or other types of pyrolysis can also include naphtha and gas oil fractions.

When a feed including heavier components is used as a feed for a pyrolysis process, and initial separation can be performed to separate the feed into a lower boiling portion for use in pyrolysis and a bottoms portion. Due to the higher boiling range, the bottoms portion is typically viewed as not suitable for pyrolysis for a variety of reasons, such as excessive coke formation and/or low yield of desired olefinic products. The separation is typically performed using some type of flash separator, sometimes referred to as a flash pot. The bottoms portion from the flash separation can be referred to as a flash bottoms fraction. Finding a high value disposition for such flash bottoms generated at or near the beginning of a pyrolysis processing train remains an ongoing problem.

In addition to generating desired olefins and/or other product fractions, one of the side products generated during pyrolysis is pyrolysis tar, such as steam cracked tar (SCT) from a steam cracking process. Disposition of steam cracked tar (SCT) has been a long-standing challenge for steam cracking operations. A typical steam cracking process can be expected to generate a few weight percent to 20 wt. % of tar. Decades of research has investigated various options for upgrading tar to more valuable dispositions and to reduce tar yield. For example, tar can be converted to syngas. SCT as boiler fuel is another relatively high value disposition, but the demand for boiler fuel is limited, and so only a small amount of tar can be processed that way. Power/electricity generation has also been considered. The amount of power generated from SCT far exceeds the power need of the cracker, making it necessary to sell electricity into highly-regulated markets. SCT has also been proposed as a carbon black feedstock (CBFS), but again there is concern whether CBFS economics can support the use of commercial quantities of tar (e.g., more than about 550,000 tonnes per year). Furthermore, CBFS has a low sulfur specification of about 1 wt. %. Since SCT contains a significant amount of the steam cracker feed's sulfur, stringent CBFS sulfur specifications lead to an undesirable limitation on steam cracker feed selection.

Direct blending of tar into fuel oil has also been considered. Unfortunately, SCT-fuel oil compatibility issues typically result in a precipitation of SCT asphaltenes in the blend. Although tar can be blended into the high sulfur fuel oil ("HSFO") pool, typically a large amount of higher-value flux, e.g., gas oil in a flux amount of 40% or more, is needed to sufficiently reduce SCT viscosity for HSFO blending.

Therefore, there are strong business drivers for finding more attractive, and ideally more broadly applicable, SCT dispositions, e.g., those involving SCT hydroprocessing. For example, SCT hydroconversion has been attempted at a typical temperature range from 250° C. to 380° C. The conventional hydroconversion process with SCT encountered significant deactivation of catalysts due to catalyst fouling. As a result, there remains a need for an improved process for hydroconverting SCT, as well as other tars. It would be further beneficial to identify systems and methods that can allow for processing of both SCT and the flash bottoms from the beginning of the steam cracking process in the same processing train.

U.S. Patent Application Publication No. 2015/0315494 describes systems and methods for improving the properties of products of a heavy feed steam cracker. The methods include using cavitation to reduce the viscosity of a steam cracked tar stream and/or a bottoms stream from a separator used to create the input feed for the steam cracker.

U.S. Pat. No. 7,906,010 describes use of steam cracked tar and/or a bottoms product from a flash drum integrated with a pyrolysis furnace as a blending stream for forming fuel oil.

SUMMARY

In various aspects, pyrolysis tar is co-processed with pre-pyrolysis flash bottoms. The co-processing can be performed under solvent assisted tar conversion conditions. By combining pyrolysis tar and flash bottoms with a solvent, various difficulties associated with hydroprocessing of the fractions can be reduced or minimized, such as difficulties associated with hydroprocessing of high viscosity feeds and/or high sulfur feeds. Optionally, separate solvents and/or fluxes can be used for the pyrolysis tar and the flash bottoms. Additionally or alternately, the co-processing can correspond to co-processing of a converted tar product with pre-pyrolysis flash bottoms. The resulting co-processed product can be suitable for a variety of uses, such as use as a low sulfur fuel oil blend component or Emission Control Area fuel blend component.

In some aspects, the pre-pyrolysis flash bottoms can correspond to a bottoms fraction produced by a separator integrated with a pyrolysis process. Additionally or alternately, any convenient source of pre-pyrolysis bottoms can be used for co-processing. Co-processing of pre-pyrolysis flash bottoms with pyrolysis tar can allow for upgrading of smaller quantities of bottoms fractions within a refinery setting without requiring a separate dedicated process train.

DETAILED DESCRIPTION

Figure 1:
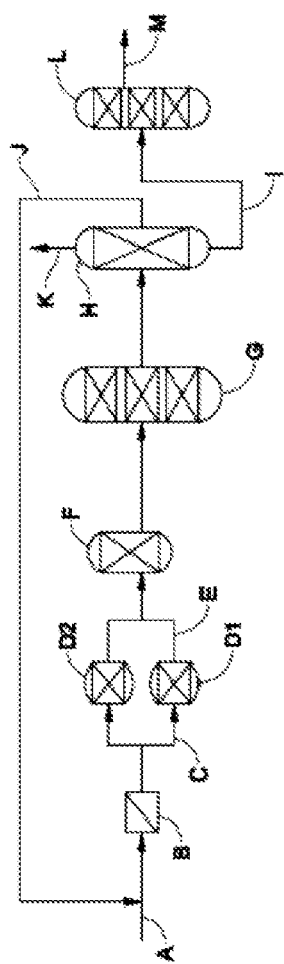
FIG. 1 shows an exemplary process flow of a tar disposition method as disclosed herein.

In various aspects, systems and methods are provided for co-processing of pyrolysis tar with pre-pyrolysis flash bottoms. In some aspects, the co-processing can correspond to solvent-assisted hydroprocessing. By combining pyrolysis tar and flash bottoms with a solvent, various difficulties associated with hydroprocessing of the fractions can be reduced or minimized, such as difficulties associated with hydroprocessing of high viscosity feeds and/or high sulfur feeds. Optionally, separate solvents and/or fluxes can be used for the pyrolysis tar and the flash bottoms. The volume ratio of flash bottoms to pyrolysis tar in the feed for solvent-assisted hydroprocessing can be any convenient ratio, such as weight ratios ranging from 0.1 to 4.0, or 0.2 to 1.5, or 0.3 to 1.0. It has been unexpectedly discovered that such weight ratios can be suitable for forming mixtures of steam cracker tar with pre-pyrolysis flash bottoms that have high compatibility for maintaining solubility of wax, asphaltenes, and/or Tar Heavies in the mixture before and during hydroprocessing. The resulting upgraded products can be suitable, for example, for inclusion in low sulfur fuel oils (LSFO).

During solvent-assisted hydroprocessing of steam cracked tar, a common source of solvent (also called a utility fluid) is to use a mid-cut portion of the total liquid product from the solvent-assisted hydroprocessing. One potential concern with co-processing pyrolysis tar with (pre-pyrolysis) flash bottoms is that the flash bottoms can have a lower solubility blending number than pyrolysis tar. Even if the initial mixture has sufficient compatibility, conversion of 566° C.+ portions of the flash bottoms could result in a mid-cut fraction with a correspondingly reduced solubility blending number, which can lessen the mid-cut fraction's ability to function as the solvent for the solvent-assisted hydroprocessing. It has been unexpectedly discovered that solvent-assisted co-processing of pyrolysis tar with flash bottoms results in a mid-cut fraction with a similar solubility blending number to a mid-cut fraction generated from solvent-assisted hydroprocessing of only the pyrolysis tar.

In some aspects, the co-processing of pyrolysis tar with flash bottoms can correspond to co-processing of flash bottoms with pyrolysis tar that has not been hydroprocessed and/or that has been only mildly hydroprocessed. For example, the flash bottoms can be combined with the pyrolysis tar and a utility fluid prior to exposing the mixture to pretreatement hydroprocessing (or guard bed processing) conditions. As another example, after exposing a mixture of pyrolysis tar and utility fluid to pretreatment conditions, the flash bottoms can be added to the mixture prior to intermediate or "first stage" hydroprocessing.

Additionally or alternately, the co-processing of pyrolysis tar with flash bottoms can correspond to co-processing of flash bottoms with a hydrotreated fraction of pyrolysis tar. For example, after solvent-assisted hydroprocessing of pyrolysis tar under intermediate hydroprocessing conditions (or "first stage" conditions), a fraction of the hydroprocessed tar can be passed into a second hydroprocessing stage for further upgrading. This hydroprocessed tar fraction can be combined with flash bottoms prior to upgrading the mixture in the second hydroprocessing stage. Based on the reduction in insolubility number for the hydroprocessed tar, the hydroprocessed tar and the flash bottoms can be co-processed with little or no additional solvent present.

One potential advantage of co-processing pyrolysis tar with (pre-pyrolysis) flash bottoms is that co-processing provides a way to upgrade two distinct heavy fractions: one that is generated in the pyrolysis process and at least one other that is not. In particular, for systems designed for heavy feed pyrolysis, the system typically includes an initial separator that is used to separate a lower boiling portion and a bottoms portion from the heavy feed. The lower boiling portion is used for pyrolysis, which results in formation of pyrolysis tar. In view of the expected future drop in usage of high sulfur fuel oils, both the pyrolysis tar and the bottoms portion of the heavy feed may need additional processing to be suitable for incorporation into a commercial fuel product, such as a low sulfur fuel oil or an emission control area (ECA) fuel. Co-processing of the pyrolysis tar with the flash bottoms can allow both fractions to be upgraded in a single reaction train for use in a commercial fuel product. This can reduce or minimize the amount of equipment that is required for upgrading a plurality of distinct feed types.

Pyrolysis tar is often high in density and sulfur. Sulfur content typically varies from less than 1 wt. % to 5 wt. %. Density typically varies from 1.14 g/cm$^3$ to 1.18 g/cm$^3$. One way in which tar is presently disposed is as a blending stock for producing HSFO, which has a sulfur specification of ≤3.5 wt. % and a density specification of ≤0.991 g/ml. Flash bottoms generated prior to/at the beginning of a pyrolysis process are also typically high in sulfur, with sulfur contents ranging from less than 1 wt. % to 6 wt. %. The density of flash bottoms can vary widely, with densities ranging from as low as 0.95 g/cm$^3$ at 15° C. to 1.1 g/cm$^3$. Flash bottoms are also often used as a blending stock for production of HSFO. Due to regulatory changes consumers of HSFO may need to use instead LSFO which has a sulfur specification of ≤0.5 wt. %. As a result, there is a need to upgrade tar and flash bottoms by reducing sulfur and density (and improving many other properties associated with tar such as incompatibility, cetane number, etc.).

Definitions

The term "pyrolysis tar" means (a) a mixture of hydrocarbons having one or more aromatic components and optionally (b) non-aromatic and/or non-hydrocarbon molecules, the mixture being derived from hydrocarbon pyrolysis, with at least 70% of the mixture having a boiling point at atmospheric pressure that is ≥about 550° F. (290° C.). Certain pyrolysis tars have an initial boiling point ≥200° C. For certain pyrolysis tars, ≥90.0 wt. % of the pyrolysis tar has a boiling point at atmospheric pressure ≥550° F. (290° C.). Pyrolysis tar can comprise, e.g., ≥50.0 wt. %, e.g., ≥75.0 wt. %, such as ≥90.0 wt. %, based on the weight of the pyrolysis tar, of hydrocarbon molecules (including mixtures and aggregates thereof) having (i) one or more aromatic components, and (ii) a number of carbon atoms ≥about 15. Pyrolysis tar generally has a metals content ≤1.0×10³ ppmw, based on the weight of the pyrolysis tar, which is an amount of metals that is far less than that found in crude oil (or crude oil components) of the same average viscosity. "SCT" means pyrolysis tar obtained from steam cracking.

The term "pre-pyrolysis flash bottoms" is defined as a bottoms fractions of hydrocarbons that are formed by performing a separation on a feed prior to a pyrolysis process in order to remove the heavier portion of the feed. In this discussion, "performing a separation prior to a pyrolysis process" means performing a separation prior to the radiant zone of a pyrolysis process. Thus, a flash bottoms fraction formed by a separation process between the radiant zone and the convection zone of a pyrolysis process is defined herein as a pre-pyrolysis flash bottoms fraction. In this discussion, unless otherwise specified, a reference to "flash bottoms" is understood to be a reference to pre-pyrolysis flash bottoms. Bottoms fractions formed from flash separators at other locations within a refinery process train will be specifically identified. The separator from which a flash bottoms fraction is withdrawn typically corresponds to a flash separator, but other convenient types of separators can also be used. The separation to form flash bottoms can be operated to form at least a lower boiling fraction (such as a fraction that is passed into the pyrolysis reactor) and a bottoms fraction. Typically, the goal of creating the lower boiling fraction is to create a fraction that will be a substantially gas phase fraction in the steam cracking environment/other pyrolysis environment. By reducing, minimizing, or eliminating the presence of liquid feed in the steam cracking environment, the amount of coke formation and/or pyrolysis tar formation in the steam cracking environment can be reduced or minimized. Thus, the bottoms fraction from the separation can sometimes be referred to as a "non-volatile" fraction. The lower boiling fraction that is passed into the pyrolysis reactor can have a T95 distillation point, or T99 distillation point, of 850° F. (~455° C.) or less. The lower boiling fraction can potentially include hydrocarbons as small as $C_1$-$C_4$ hydrocarbons. Optionally, the lower boiling fraction can have a T5 distillation point of 0° C. or more, or 10° C. or more, so that the lower boiling fraction substantially corresponds to a liquid fraction at 20° C. and 100 kPa-a. The bottoms fraction can have a T5 distillation point of 400° C. or more, or 420° C. or more, or 450° C. or more, depending on the quality of the separation. The bottoms fraction can potentially include any heavier hydrocarbons that might be present in a whole crude oil, such as components with a boiling point of up to 720° C. or possibly still higher. In aspects where the separation to form the lighter fraction and the bottoms fraction is performed using a flash separation, the inlet temperature of the separator can be 400° C. to 450° C., or 420° C. to 450° C. It is noted that although the examples provided in this discussion correspond to flash bottoms formed during a separation to form a lighter fraction for use as a pyrolysis feed, other types of bottoms fractions that have a suitable boiling range could also be used, so long as the bottoms fractions have not been previously exposed to pyrolysis conditions. For example, a virgin vacuum resid fraction having a T5 distillation point of 400° C. or more could be used as a pre-pyrolysis bottoms fraction.

The term "total liquid product" refers to all products from a process, such as hydroprocessing, that have a boiling point of 10° C. or more at 101 kPa-a. For hydrocarbons, this corresponds to roughly $C_5$ and higher hydrocarbons (namely, $C_{5+}$). It is in contrast to a light ends product, which typically contains $C_{4-}$ hydrocarbons as well as other products with a boiling point of less than 10° C.

Generally, for solvent-assisted co-processing, a mixture of pyrolysis tar and (pre-pyrolysis) flash bottoms can be hydroprocessed in the presence of one or more solvents/utility fluids, e.g., as a mixture of tar, flash bottoms, and the specified solvents/utility fluids. Alternatively, for solvent-assisted hydroprocessing of pyrolysis tar, the pyrolysis tar can be hydroprocessed in the presence of a utility fluid.

"Tar Heavies" (TH) are a product of hydrocarbon pyrolysis having an atmospheric boiling point ≥565° C. and comprising ≥5.0 wt. % of molecules having a plurality of aromatic cores based on the weight of the product. The TH are typically solid at 25° C. and generally include the fraction of SCT that is not soluble in a 5:1 (vol.:vol.) ratio of n-pentane:SCT at 25° C. TH generally includes asphaltenes and other high molecular weight molecules.

A method of characterizing the solubility properties of a petroleum fraction can correspond to the toluene equivalence (TE) of a fraction, based on the toluene equivalence test as described for example in U.S. Pat. No. 5,871,634, which is incorporated herein by reference with regard to the definition for toluene equivalence, solubility blending number ($S_{BN}$), and insolubility number (IN).

Briefly, the determination of the Insolubility Number and the Solubility Blending Number for a petroleum oil containing asphaltenes requires testing the solubility of the oil in test liquid mixtures at the minimum of two volume ratios of oil to test liquid mixture. The test liquid mixtures are prepared by mixing two liquids in various proportions. One liquid is nonpolar and a solvent for the asphaltenes in the oil while the other liquid is nonpolar and a nonsolvent for the asphaltenes in the oil. Since asphaltenes are defined as being insoluble in n-heptane and soluble in toluene, it is most convenient to select the same n-heptane as the nonsolvent for the test liquid and toluene as the solvent for the test liquid. Although the selection of many other test nonsolvents and test solvents can be made, there use provides not better definition of the preferred oil blending process than the use of n-heptane and toluene described here.

A convenient volume ratio of oil to test liquid mixture is selected for the first test, for instance, 1 ml. of oil to 5 ml. of test liquid mixture. Then various mixtures of the test liquid mixture are prepared by blending n-heptane and toluene in various known proportions. Each of these is mixed with the oil at the selected volume ratio of oil to test liquid mixture. Then it is determined for each of these if the asphaltenes are soluble or insoluble. Any convenient method might be used. One possibility is to observe a drop of the blend of test liquid mixture and oil between a glass slide and a glass cover slip using transmitted light with an optical microscope at a magnification of from 50 to 600×. If the asphaltenes are in solution, few, if any, dark particles will be observed. If the asphaltenes are insoluble, many dark, usually brownish, particles, usually 0.5 to 10 microns in size, will be observed. Another possible method is to put a drop of the blend of test liquid mixture and oil on a piece of filter paper and let dry. If the asphaltenes are insoluble, a dark ring or circle will be seen about the center of the yellow-brown spot made by the oil. If the asphaltenes are soluble, the color of the spot made by the oil will be relatively uniform in color. The results of blending oil with all of the test liquid mixtures are ordered according to increasing percent toluene in the test liquid mixture. The desired value will be between the minimum percent toluene that dissolves asphaltenes and the maximum percent toluene that precipitates asphaltenes. More test liquid mixtures are prepared with percent toluene in between these limits, blended with oil at the selected oil to test liquid mixture volume ratio, and determined if the asphaltenes are soluble or insoluble. The desired value will be between the minimum percent toluene that dissolves asphaltenes and the maximum percent toluene that precipitates asphaltenes. This process is continued until the desired value is determined within the desired accuracy. Finally, the desired value is taken to be the mean of the minimum percent toluene that dissolves asphaltenes and the maximum percent toluene that precipitates asphaltenes. This is the first datum point, $T_1$, at the selected oil to test liquid mixture volume ratio, $R_1$. This test is called the toluene equivalence test.

The second datum point can be determined by the same process as the first datum point, only by selecting a different oil to test liquid mixture volume ratio. Alternatively, a percent toluene below that determined for the first datum point can be selected and that test liquid mixture can be added to a known volume of oil until asphaltenes just begin to precipitate. At that point the volume ratio of oil to test liquid mixture, $R_2$, at the selected percent toluene in the test liquid mixture, T2, becomes the second datum point. Since the accuracy of the final numbers increase as the further apart the second datum point is from the first datum point, the preferred test liquid mixture for determining the second datum point is 0% toluene or 100% n-heptane. This test is called the heptane dilution test.

The Insolubility Number, $I_N$, is given by:

$$I_N = T_2 - \left[\frac{T_2 - T_1}{R_2 - R_1}\right] R_2 \quad (1)$$

The Solubility Blending Number, $S_{BN}$, is given by:

$$S_{BN} = I_N \left[1 + \frac{1}{R_2}\right] - \frac{T_2}{R_2} \quad (2)$$

It is noted that additional procedures are available, such as those specified in U.S. Pat. No. 5,871,634, for determination of $S_{BN}$ for oil samples that do not contain asphaltenes.

All numerical values within the detailed description and the claims herein are modified by "about" or "approximately" the indicated value, and take into account experimental error and variations that would be expected by a person having ordinary skill in the art.

Process Overview

FIG. 1 shows an overview of certain aspects of the instant process. A stream to be processed A, including pyrolysis tar, is thermally treated to reduce reactivity during transport to a centrifuge B. Optionally, if solvent-assisted co-processing of flash bottoms is desired, the flash bottoms can be added to the pyrolysis tar at any convenient location, including prior to the start of the thermal treatment, during the thermal treatment, after passing through centrifuge B, after exiting from guard reactor D1 or D2, or after pretreatment hydroprocessing in reactor F. Optionally but preferably, the flash bottoms can be added prior to treatment in guard reactor D1 or D2, so that guard reactor D1 or D2 can be used to reduce any metals content present in the flash bottoms. Additionally or alternately, if co-processing of flash bottoms with hydroprocessed pyrolysis tar is desired, flash bottoms can be added to the hydroprocessed tar stream at any location after reactor G and prior to second stage hydroprocessing in reactor L. A utility fluid J (which may act as a solvent for at least a portion of the tar's hydrocarbon compounds and optionally as a solvent for flash bottoms) may be added to the tar (or mixture of tar and flash bottoms) to form a tar-fluid mixture of decreased viscosity as compared to the tar and flash bottoms. Utility fluid may be recovered from the process for recycle by separation in recovery facility H as shown. A filter (not shown) may be included in the transport line to remove relatively large insoluble, e.g., relatively large solids. The thermally processed tar stream (or mixture of tar and flash bottoms) is centrifuged to remove insoluble (e.g., solids) larger than 25 µm. The "cleared" liquid product mixture is then fed to a guard reactor, in the present illustration via a pretreatment manifold C, which directs the mixture between an online guard reactor D1 and a guard reactor D2 that can be held offline, for instance for maintenance. The guard reactor is operated under mild hydroprocessing conditions to further reduce the tar reactivity in the mixture. The effluent from the guard reactor passes through an outlet manifold E to a pretreatment hydroprocessing reactor F for further hydroprocessing under somewhat harsher conditions and with a more active catalyst. The effluent from the pretreatment hydroprocessing reactor passes to a main hydroprocessing reactor G for further hydroprocessing under yet more severe conditions to obtain a Total Liquid Product ("TLP") that is of blending quality, but typically remains somewhat high in sulfur. Recovery facility H includes at least one separation, e.g., fractionation, for separating from the TLP (i) a light stream K suitable for fuels use, (ii) a bottom fraction I which includes heavier components of the TLP, and (iii) a mid-cut. At least a portion of the mid-cut can be recycled to the tar feed (or mixture of tar and flash bottoms) as utility fluid via line J. The bottoms fraction I is fed to a second stage hydroprocessing reactor L for an additional hydroprocessing step that provides desulfurization. The effluent stream M from the second stage hydroprocessing reactor is of low sulfur content and is suitable for blending into an ECA compliant fuel.

In some alternative aspects, the flash bottoms can be added to the bottoms fraction I for processing in second stage hydroprocessing reactor L. In some aspects, the feed A may optionally contain only pyrolysis tar, so that the co-processing occurs only in the second stage hydroprocessing reactor L. In other aspects, the feed A can correspond to a mixture of flash bottoms and pyrolysis tar, with additional flash bottoms also added to bottoms fraction I.

Pyrolysis Tar

Representative tars, such as pyrolysis tars, will now be described in more detail. The invention is not limited to use of these pyrolysis tars, and this description is not meant to foreclose use of other pyrolysis tars, e.g., tars derived from the pyrolysis of coal and/or the pyrolysis of biological material (e.g., biomass) within the broader scope of the invention.

Pyrolysis tar is a product or by-product of hydrocarbon pyrolysis, e.g., steam cracking. Effluent from the pyrolysis is typically in the form of a mixture comprising unreacted feed, unsaturated hydrocarbon produced from the feed during the pyrolysis, and pyrolysis tar. The pyrolysis tar typically comprises ≥90 wt. %, of the pyrolysis effluent's molecules having an atmospheric boiling point of ≥290° C. Besides hydrocarbon, the feed to pyrolysis optionally further comprises diluent, e.g., one or more of nitrogen, water, etc.

Steam cracking, which produces SCT, is a form of pyrolysis which uses a diluent comprising an appreciable amount of steam. Steam cracking will now be described in more detail. The invention is not limited to use of pyrolysis tars produced by steam cracking, and this description is not meant to foreclose utilization of pyrolysis tar formed by other pyrolysis methods within the broader scope of the invention.

Steam Cracking

A steam cracking plant typically comprises a furnace facility for producing steam cracking effluent and a recovery facility for removing from the steam cracking effluent a plurality of products and by-products, e.g., light olefin and pyrolysis tar. The furnace facility generally includes a plurality of steam cracking furnaces. Steam cracking furnaces typically include two main sections: a convection section and a radiant section, the radiant section typically containing fired heaters. Flue gas from the fired heaters is conveyed out of the radiant section to the convection section. The flue gas flows through the convection section and is then conducted away, e.g., to one or more treatments for removing combustion by-products such as NON. Hydrocarbon is introduced into tubular coils (convection coils) located in the convection section. Steam is also introduced into the coils, where it combines with the hydrocarbon to produce a steam cracking feed. The combination of indirect heating by the flue gas and direct heating by the steam leads to vaporization of at least a portion of the steam cracking feed's hydrocarbon component. The steam cracking feed containing the vaporized hydrocarbon component is then transferred from the convection coils to tubular radiant tubes located in the radiant section. Indirect heating of the steam cracking feed in the radiant tubes results in cracking of at least a portion of the steam cracking feed's hydrocarbon component. Steam cracking conditions in the radiant section, can include, e.g., one or more of (i) a temperature in the range of 760° C. to 880° C., (ii) a pressure in the range of from 1.0 to 5.0 bars (absolute), or (iii) a cracking residence time in the range of from 0.10 to 2.0 seconds.

Steam cracking effluent is conducted out of the radiant section and is quenched, typically with water or quench oil. The quenched steam cracking effluent ("quenched effluent") is conducted away from the furnace facility to the recovery facility, for separation and recovery of reacted and unreacted components of the steam cracking feed. The recovery facility typically includes at least one separation stage, e.g., for separating from the quenched effluent one or more of light olefin, steam cracker naphtha, steam cracker gas oil, SCT, water, light saturated hydrocarbon, molecular hydrogen, etc.

Steam cracking feed typically comprises hydrocarbon and steam, e.g., ≥10.0 wt. % hydrocarbon, based on the weight of the steam cracking feed, e.g., ≥25.0 wt. %, ≥50.0 wt. %, such as ≥65 wt. %. Although the hydrocarbon can comprise one or more light hydrocarbons such as methane, ethane, propane, butane etc., it can be particularly advantageous to include a significant amount of higher molecular weight hydrocarbon. While doing so typically decreases feed cost, steam cracking such a feed typically increases the amount of SCT in the steam cracking effluent. One suitable steam cracking feed comprises ≥1.0 wt. %, e.g., ≥10 wt. %, such as ≥25.0 wt. %, or ≥50.0 wt. % (based on the weight of the steam cracking feed) of hydrocarbon compounds that are in the liquid and/or solid phase at ambient temperature and atmospheric pressure.

The hydrocarbon portion of a steam cracking feed typically comprises ≥10.0 wt. %, e.g., ≥50.0 wt. %, such as ≥90.0 wt. % (based on the weight of the hydrocarbon) of one or more of naphtha, gas oil, vacuum gas oil, waxy residues, atmospheric residues, residue admixtures, or crude oil; including those comprising ≥about 0.1 wt. % asphaltenes. When the hydrocarbon includes crude oil and/or one or more fractions thereof, the crude oil is optionally desalted prior to being included in the steam cracking feed. A crude oil fraction can be produced by separating atmospheric pipestill ("APS") bottoms from a crude oil followed by vacuum pipestill ("VPS") treatment of the APS bottoms. One or more vapor-liquid separators can be used upstream of the radiant section, e.g., for separating and conducting away a portion of any non-volatiles in the crude oil or crude oil components. The portion of non-volatiles conducted away in such a separation corresponds to a pre-pyrolysis flash bottoms fraction. At least a portion of the flash bottoms fraction can be subsequently co-processed with pyrolysis tar made during the steam cracking process. In certain aspects, such a separation stage is integrated with the steam cracker by preheating the crude oil or fraction thereof in the convection section (and optionally by adding of dilution steam), separating a bottoms steam comprising non-volatiles, and then conducting a primarily vapor overhead stream as feed to the radiant section.

Suitable crude oils include, e.g., high-sulfur virgin crude oils, such as those rich in polycyclic aromatics. For example, the steam cracking feed's hydrocarbon can include ≥90.0 wt. % of one or more crude oils and/or one or more crude oil fractions, such as those obtained from an atmospheric APS and/or VPS; waxy residues; atmospheric residues; naphthas contaminated with crude; various residue admixtures; and SCT.

SCT is typically removed from the quenched effluent in one or more separation stages, e.g., as a bottoms stream from one or more tar drums. Such a bottoms stream typically comprises ≥90.0 wt. % SCT, based on the weight of the bottoms stream. The SCT can have, e.g., a boiling range ≥about 550° F. (290° C.) and can comprise molecules and mixtures thereof having a number of carbon atoms ≥about 15. Typically, quenched effluent includes ≥1.0 wt. % of $C_2$ unsaturates and ≥0.1 wt. % of TH, the weight percents being based on the weight of the pyrolysis effluent. It is also typical for the quenched effluent to comprise ≥0.5 wt. % of TH, such as ≥1.0 wt. % TH.

Representative SCTs will now be described in more detail. The invention is not limited to use of these SCTs, and this description is not meant to foreclose the processing of other pyrolysis tars within the broader scope of the invention.

Steam Cracker Tar

Conventional separation equipment can be used for separating SCT and other products and by-products from the quenched steam cracking effluent, e.g., one or more flash drums, knock out drums, fractionators, water-quench towers, indirect condensers, etc. Suitable separation stages are described in U.S. Pat. No. 8,083,931, for example. SCT can be obtained from the quenched effluent itself and/or from one or more streams that have been separated from the quenched effluent. For example, SCT can be obtained from a steam cracker gas oil stream and/or a bottoms stream of the steam cracker's primary fractionator, from flash-drum bottoms (e.g., the bottoms of one or more tar knock out drums located downstream of the pyrolysis furnace and upstream of the primary fractionator), or a combination thereof. Certain SCTs are a mixture of primary fractionator bottoms and tar knock-out drum bottoms. It is noted that the primary fractionator bottoms and the tar knock-out drum bottoms both correspond to a post-pyrolysis bottoms fractions. That is in contrast to the pre-pyrolysis flash bottoms fractions described herein.

A typical SCT stream from one or more of these sources generally contains ≥90.0 wt. % of SCT, based on the weight of the stream, e.g., ≥95.0 wt. %, such as ≥99.0 wt. %. More than 90 wt. % of the remainder of the SCT stream's weight (e.g., the part of the stream that is not SCT, if any) is typically particulates. The SCT typically includes ≥50.0 wt. %, e.g., ≥75.0 wt. %, such as ≥90.0 wt. % of the quenched effluent's TH, based on the total weight TH in the quenched effluent.

The TH are typically in the form of aggregates which include hydrogen and carbon and which have an average size in the range of 10.0 nm to 300.0 nm in at least one dimension and an average number of carbon atoms ≥50. Generally, the TH comprise ≥50.0 wt. %, e.g., ≥80.0 wt. %, such as ≥90.0 wt. % of aggregates having a C:H atomic ratio in the range of from 1.0 to 1.8, a molecular weight in the range of 250 to 5000, and a melting point in the range of 100° C. to 700° C.

Representative SCTs typically have (i) a TH content in the range of from 5.0 wt. % to 40.0 wt. %, based on the weight of the SCT, (ii) an API gravity (measured at a temperature of 15.8° C.) of ≤8.5° API, such as ≤8.0° API, or ≤7.5° API; and (iii) a 50° C. viscosity in the range of 200 cSt to $1.0 \times 10^7$ cSt, e.g., $1 \times 10^3$ cSt to $1.0 \times 10^7$ cSt, as determined by A.S.T.M. D445. The SCT can have, e.g., a sulfur content that is ≥0.5 wt. %, or ≥1 wt. %, or more, e.g., in the range of 0.5 wt. % to 7.0 wt. %, based on the weight of the SCT. In aspects where steam cracking feed does not contain an appreciable amount of sulfur, the SCT can comprise ≤0.5 wt. % sulfur, e.g., ≤0.1 wt. %, such as ≤0.05 wt. % sulfur, based on the weight of the SCT.

The SCT can have, e.g., (i) a TH content in the range of from 5.0 wt. % to 40.0 wt. %, based on the weight of the SCT; (ii) a density at 15° C. in the range of 1.01 g/cm³ to 1.19 g/cm³, e.g., in the range of 1.07 g/cm³ to 1.18 g/cm³; and (iii) a kinematic viscosity at 100° C. viscosity ≥100 cSt, e.g., ≥600 cSt, or in the range of from 100 cSt to $1.0 \times 10^7$ cSt. The specified hydroprocessing is particularly advantageous for SCTs having 15° C. density that is ≥1.10 g/cm³, e.g., ≥1.12 g/cm³, ≥1.14 g/cm³, ≥1.16 g/cm³, or ≥1.17 g/cm³. Optionally, the SCT has an $I_N$≥80 and ≥70 wt. % of the pyrolysis tar's molecules have an atmospheric boiling point of ≥290° C.

Optionally, the SCT has a normal boiling point ≥290° C., a viscosity at 15° C. ≥$1 \times 10^4$ cSt, and a density ≥1.1 g/cm³. The SCT can be a mixture which includes a first SCT and one or more additional pyrolysis tars, e.g., a combination of the first SCT and one or more additional SCTs. When the SCT is a mixture, it is typical for at least 70 wt. % of the mixture to have a normal boiling point of at least 290° C., and include olefinic hydrocarbon which contribute to the tar's reactivity under hydroprocessing conditions. When the mixture comprises first and second pyrolysis tars (one or more of which is optionally an SCT) ≥90 wt. % of the second pyrolysis tar optionally has a normal boiling point ≥290° C.

It has been found that an increase in reactor fouling occurs during hydroprocessing of a tar-fluid mixture comprising an SCT having an excessive amount of olefinic hydrocarbon. It is also observed that less fouling of the guard reactor and/or pretreater occurs when the thermally treated tar (e.g., heat soaked SCT) is subjected to the specified insolubles-removal treatment, e.g., using filtration and/or centrifugation. The decreased fouling in the guard reactor and pretreater is advantageous because it results in longer guard reactor and pretreater run lengths, e.g., run lengths comparable to those of reactors G and L (FIG. 1). This decreases the need for additional guard reactor and pretreater reactors, which would otherwise be needed, e.g., to substitute for a pretreater reactor brought off-line for regeneration while reactors G and L continue in operation. See, e.g., guard reactor 704B, which can be brought on-line while guard reactor 704A undergoes regeneration, e.g., by stripping with molecular hydrogen.

In addition to the above properties, steam cracker tars can also be characterized with regard to a variety of features, including sulfur content, hydrogen content, n-heptane insolubles content (sometimes referred to as $C_7$ asphaltenes), solubility number ($S_{BN}$), insolubility number ($I_N$), and the content of various metals, such as sodium, vanadium, and aluminum.

SCT can have a relatively low hydrogen content compared to heavy oil fractions that are typically processed in a refinery setting. In some aspects, SCT can have a hydrogen content of 8.0 wt. % or less, or 7.5 wt. % or less, or 7.0 wt. % or less, or 6.5 wt. % or less, such as down to 5.5 wt. % or possibly still lower.

SCT can also be highly aromatic in nature. The paraffin content of SCT can be 2.0 wt. % or less, or 1.0 wt. % or less, such as having substantially no paraffin content. Optionally, the naphthene content of SCT can also be 2.0 wt. % or less or 1.0 wt. % or less, such as having substantially no naphthene content. In some aspects, the combined paraffin and naphthane content of SCT can be 1.0 wt. % or less. With regard to aromatics, at least 30 wt. % of SCT can correspond to 3-ring aromatics, or at least 40 wt. %. In particular, the 3-ring aromatics content can be 30 wt. % to 60 wt. %, or 40 wt. % to 55 wt. %, or 40 wt. % to 50 wt. %. Additionally or alternately, at least 30 wt. % of SCT can correspond to 4-ring aromatics, or at least 40 wt. %. In particular, the 4-ring aromatics content can be 30 wt. % to 60 wt. %, or 40 wt. % to 55 wt. %, or 40 wt. % to 50 wt. %. Additionally or alternately, the 1-ring aromatic content can be 15 wt. % or less, or 10 wt. % or less, or 5 wt. % or less, such as down to 0.1 wt. % or possibly still lower.

Due to the low hydrogen content and/or highly aromatic nature of SCT, the solubility blending number ($S_{BN}$) and insolubility number ($I_N$) of SCT can be relatively high. SCT can have a $S_{BN}$ of 100 or more, and in particular 120 to 230, or 150 to 230, or 180 to 220. Additionally or alternately, SCT can have an $I_N$ of 70 to 180, or 100 to 160, or 80 to 140. Further additionally or alternately, the difference between $S_{BN}$ and $I_N$ for the SCT can be at least 30, or at least 40, or at least 50, such as up to 150 or possibly still more.

The amount of n-heptane insolubles ($C_7$ asphaltenes) in an SCT fraction can be relatively high, with n-heptane insoluble values of 10 wt. % to 50 wt. %. By contrast, because SCT is typically formed from a feed where a bottoms portion has been removed, the metals content of an SCT fraction is typically low. The sodium content can be 5 wppm or less and the vanadium content can be 5 wppm or less.

Pre-Pyrolysis Flash Bottoms

Flash bottoms as described herein correspond to a pre-pyrolysis bottoms fraction. A typical (pre-pyrolysis) flash bottoms stream can generally contain ≥70.0 wt. % of flash bottoms, based on the weight of the stream, e.g., ≥90.0 wt. %, or ≥95.0 wt. %, such as ≥99.0 wt. %. The additional portions of a flash bottoms stream can correspond to other heavy fractions, so that the flash bottoms stream (prior to mixing with SCT and/or utility fluid) has a T5 distillation point of 400° C. or more, or 420° C. or more, or 450° C. or more.

Representative flash bottoms fractions typically have a kinematic viscosity at 100° C. in the range of 50 cSt to $1.0 \times 10^5$ cSt, as determined by A.S.T.M. D445. The flash bottoms can have, e.g., a sulfur content that is ≥0.5 wt. %, or ≥1 wt. %, or more, e.g., in the range of 0.5 wt. % to 6.0 wt. %, based on the weight of the flash bottoms. The flash bottoms can have a density at 15° C. in the range of 0.94 g/cm³ to 1.09 g/cm³. Flash bottoms from a separation prior to pyrolysis can have a hydrogen content of 8.0 wt. % to 12.0 wt. %, or 8.5 wt. % to 11.5 wt. %.

Flash bottoms can have a $S_{BN}$ of 80 or more, and in particular 100 to 200, or 120 to 200, or 120 to 180. Additionally or alternately, flash can have an $I_N$ of 40 to 140, or 60 to 140, or 60 to 120. Further additionally or alternately, the difference between $S_{BN}$ and $I_N$ for the flash bottoms can be at least 20, or at least 30, or at least 40, such as up to 100 or possibly still more. Optionally, the flash bottoms have an $S_{BN}$ that is less than that of the tar. Alternatively or in addition, the flash bottoms have an $I_N$ that is less than that of the tar.

The amount of n-heptane insolubles ($C_7$ asphaltenes) in a flash bottoms fraction can be 3.0 wt. % to 10 wt. %. The metals content of a flash bottoms fraction can potentially be greater than the metal content for an SCT fraction. For example, the sodium content for a flash bottoms fraction can be 0.1 wppm to 10 wppm, or 2.0 wppm to 10 wppm, and the vanadium content can be 0.1 wppm to 50 wppm, or 5.0 wppm to 50 wppm.

Utility Fluids and Other Solvents

Suitable utility fluids typically comprise a mixture of multi-ring compounds. The rings can be aromatic or non-aromatic, and can contain a variety of substituents and/or heteroatoms. For example, a utility fluid can contain ring compounds in an amount ≥40.0 wt. %, ≥45.0 wt. %, ≥50.0 wt. %, ≥55.0 wt. %, or ≥60.0 wt. %., based on the weight of the utility fluid. In certain aspects, at least a portion of a utility fluid is obtained from a hydroprocessor effluent, e.g., by one or more separations. This can be carried out as disclosed in U.S. Pat. No. 9,090,836, which is incorporated by reference herein in its entirety.

Typically, a utility fluid comprises aromatic hydrocarbon, e.g., ≥25.0 wt. %, such as ≥40.0 wt. %, or ≥50.0 wt. %, or ≥55.0 wt. %, or ≥60.0 wt. % of aromatic hydrocarbon, based on the weight of the utility fluid. The aromatic hydrocarbon can include, e.g., one, two, and three ring aromatic hydrocarbon compounds. For example, the utility fluid can comprise ≥15 wt. % of 2-ring and/or 3-ring aromatics, based on the weight of the utility fluid, such as ≥20 wt. %, or ≥25.0 wt. %, or ≥40.0 wt. %, or ≥50.0 wt. %, or ≥55.0 wt. %, or ≥60.0 wt. %. Utilizing a utility fluid comprising aromatic hydrocarbon compounds having 2-rings and/or 3-rings is advantageous because utility fluids containing these compounds typically exhibit an appreciable $S_{BN}$. Suitable utility fluids typically have a significant solvency power, e.g., as indicated by an $S_{BN} \geq 80$, e.g., ≥100 or ≥120, but the invention is not limited to the use thereof. Such utility fluids typically contain a major amount of 2 to 4 ring aromatics, with some being partially hydrogenated.

A utility fluid typically has an A.S.T.M. D86 10% distillation point ≥60° C. and a 90% distillation point ≤425° C., e.g., ≤400° C. In certain aspects, the utility fluid has a true boiling point distribution with an initial boiling point ≥130° C. (266° F.) and a final boiling point ≤566° C. (1050° F.). In other aspects, the utility fluid has a true boiling point distribution with an initial boiling point ≥150° C. (300° F.) and a final boiling point ≤430° C. (806° F.). In still other aspects, the utility has a true boiling point distribution with an initial boiling point ≥177° C. (350° F.) and a final boiling point ≤425° C. (797° F.). True boiling point distributions (the distribution at atmospheric pressure) can be determined, e.g., by conventional methods such as the method of A.S.T.M. D7500. When the final boiling point is greater than that specified in the standard, the true boiling point distribution can be determined by extrapolation. A particular form of the utility fluid has a true boiling point distribution having an initial boiling point ≥130° C. and a final boiling point ≤566° C.; and/or comprises ≥15 wt. % of two ring and/or three ring aromatic compounds.

In certain aspects the process includes treating (e.g., by mild hydroprocessing) a tar-fluid mixture in a guard reactor, and then carrying out the pretreatment under Pretreatment Hydroprocessing Conditions, where the feed to the pretreater comprises at least a portion of the guard reactor's effluent, e.g., a major amount of the guard reactor's effluent, such as substantially all of the guard reactor's effluent. These aspects typically feature one or more of (i) a utility fluid having an $S_{BN} \geq 80$, e.g., $S_{BN} \geq 100$, or $S_{BN} \geq 100$, or $S_{BN} \geq 120$, (ii) a pyrolysis tar having an $I_N \geq 70$, e.g., ≥80; and (iii) ≥70 wt. % of the pyrolysis tar resides in compositions having an atmospheric boiling point ≥290° C., e.g., ≥80 wt. %, or ≥90 wt. %. The tar-fluid mixture can have, e.g., an $S_{BN} \geq 110$, such as ≥120, or ≥130. It has been found that there is a beneficial decrease in reactor plugging, particularly in the guard reactor and/or pretreater, when the tar feed has an $I_N \geq 110$ provided that, after being combined with the utility fluid, the feed has an $S_{BN} \geq 150$, ≥155, or ≥160. The pyrolysis tar can have a relatively large $I_N$, e.g., $I_N \geq 80$, especially ≥100, or ≥110, provided the utility fluid has relatively large $S_{BN}$, e.g., ≥100, ≥120, or ≥140.

In other aspects, a tar-fluid mixture including tar, flash bottoms, a utility fluid, and optionally an additional flux or solvent for the flash bottoms can be produced by combining a pyrolysis tar, e.g., SCT, and flash bottoms with a sufficient amount of a utility fluid for the mixture to have a viscosity that is sufficiently low for the mixture to be conveyed to hydroprocessing, e.g., a 50° C. kinematic viscosity of the tar-fluid mixture that is ≤500 cSt. The amounts of utility fluid, flash bottoms, and pyrolysis tar in the tar-fluid mixture to achieve such a viscosity are generally in the range of from 20.0 wt. % to 90.0 wt. % of the pyrolysis tar, from 5.0 wt. % to 50.0 wt. % of the flash bottoms, and from 5.0 wt. % to 80.0 wt. % of the utility fluid, based on total weight of mixture. For example, the relative amounts of utility fluid, flash bottoms, and pyrolysis tar in the mixture can be in the range of (i) from 20.0 wt. % to about 80.0 wt. % of the pyrolysis tar, from 20.0 wt. % to 50.0 wt. % flash bottoms, and from 10.0 wt. % to 80.0 wt. % of the utility fluid, or (ii) from 40.0 wt. % to 90.0 wt. % of the pyrolysis tar, from 10.0 wt. % to 50.0 wt. % flash bottoms, and from about 10.0 wt. % to about 60.0 wt. % of the utility fluid. The utility fluid: pyrolysis tar weight ratio is typically ≥0.01, e.g., in the range of 0.05 to 4.0, such as in the range of 0.1 to 3.0, or 0.3 to 1.1. In certain aspects, particularly when the pyrolysis tar comprises a representative SCT, the mixture can comprise 50 wt. % to 80 wt. % of combined pyrolysis tar and flash bottoms, with ≥90 wt. % of the balance of the mixture comprising the specified utility fluid, e.g., ≥95 wt. %, such as ≥99 wt. In some aspects, a weight ratio of the flash bottoms to the pyrolysis tar can be 1.5 or less, or 1.0 or less.

In some aspects, a flash bottoms fraction can be used without additional flux or solvent. In other aspects, it may be desirable to include flux or solvent to enhance the fluid flow properties of the flash bottoms. If sufficient mid-cut fraction is available, a recycled mid-cut fraction can be suitable for use both as a utility fluid for pyrolysis tar and as an optional flux or solvent for flash bottoms. Although the utility fluid can be combined with the pyrolysis tar and/or the flash bottoms to produce the tar-fluid mixture within the hydroprocessing stage, it is typical to combine the pyrolysis tar, the flash bottoms, and the utility fluid upstream of the hydroprocessing. Alternatively, if a separate solvent is desired for the flash bottoms, up to 15 wt. % of the utility fluid can be replaced by a second solvent that is used as a flux for the flash bottoms, when flash bottoms is combined with pyrolysis tar prior to intermediate hydroprocessing. More generally, if a solvent or flux is desired for the flash bottoms, either for introduction of flash bottoms into the intermediate hydroprocessing or introduction into a final upgrading stage, suitable solvents can include cracked gas oil fractions, such as steam cracked gas oil. Other suitable solvents can include solvents with a $S_{BN}$ of 60 or more, or 80 or more. It is noted that cracked gas oil fractions can tend to be reactive, so cracked gas oil fractions used as a flux or solvent can preferably be limited to 20 wt. % or less of a feed, or 15 wt. % or less, or 10 wt. % or less.

In some aspects, a utility fluid can be combined with pyrolysis tar that is being processed during a heat soaking process step that reduces the reactivity of the tar. (See, e.g. FIG. 2, line 56 ("optional flux" inlet).) In some embodiments, the utility fluid is added to the tar after a heat soaking process step has been applied to the tar and before the process stream is fed into a solids-removal step. (This arrangement is not shown in the figures.)

In various aspects, the tar and/or flash bottoms are combined with a utility fluid to produce a mixture. Mixing of compositions comprising hydrocarbons can result in precipitation of certain solids, for example asphaltenes, from the mixture. Hydrocarbon compositions that produce such precipitates upon mixing are said to be "incompatible." Creating an incompatible mixture can be avoided by mixing only compositions such that the "solubility blending number", $S_{BN}$, of all of the components of the mixture is greater than the "insolubility number", $I_N$, of all of the components of the mixture.

In certain aspects the process includes treating (e.g., by mild hydroprocessing) a tar-utility fluid mixture or a tar-flash bottoms-utility fluid mixture in a guard reactor, and then carrying out the pretreatment under Pretreatment Hydroprocessing Conditions, where the feed to the pretreater comprises at least a portion of the guard reactor's effluent, e.g., a major amount of the guard reactor's effluent, such as substantially all of the guard reactor's effluent. These aspects typically feature one or more of (i) a utility fluid having an $S_{BN}\geq 80$, e.g., $S_{BN}\geq 100$, or $S_{BN}\geq 110$; (ii) a pyrolysis tar having an $I_N\geq 70$, e.g., $\geq 80$; and (iii) $\geq 70$ wt. % of the pyrolysis tar resides in compositions having an atmospheric boiling point $\geq 290°$ C., e.g., $\geq 80$ wt. %, or $\geq 90$ wt. %. The tar-utility fluid mixture or the tar-flash bottoms-utility fluid mixture can have, e.g., an $S_{BN}\geq 110$, such as $\geq 120$, or $\geq 130$. It has been found that there is a beneficial decrease in reactor plugging, particularly in the guard reactor and/or pretreater, when the feed has an $I_N>110$ provided that, after being combined with the utility fluid (and optionally flash bottoms), the feed has an $S_{BN}\geq 150$, $\geq 155$, or $\geq 160$. The pyrolysis tar can have a relatively large $I_N$, e.g., $I_N\geq 80$, especially >100, or >110, provided the flash bottoms and/or the utility fluid has relatively large $S_{BN}$, e.g., $\geq 100$, $\geq 120$, or $\geq 140$.

Figure 2:
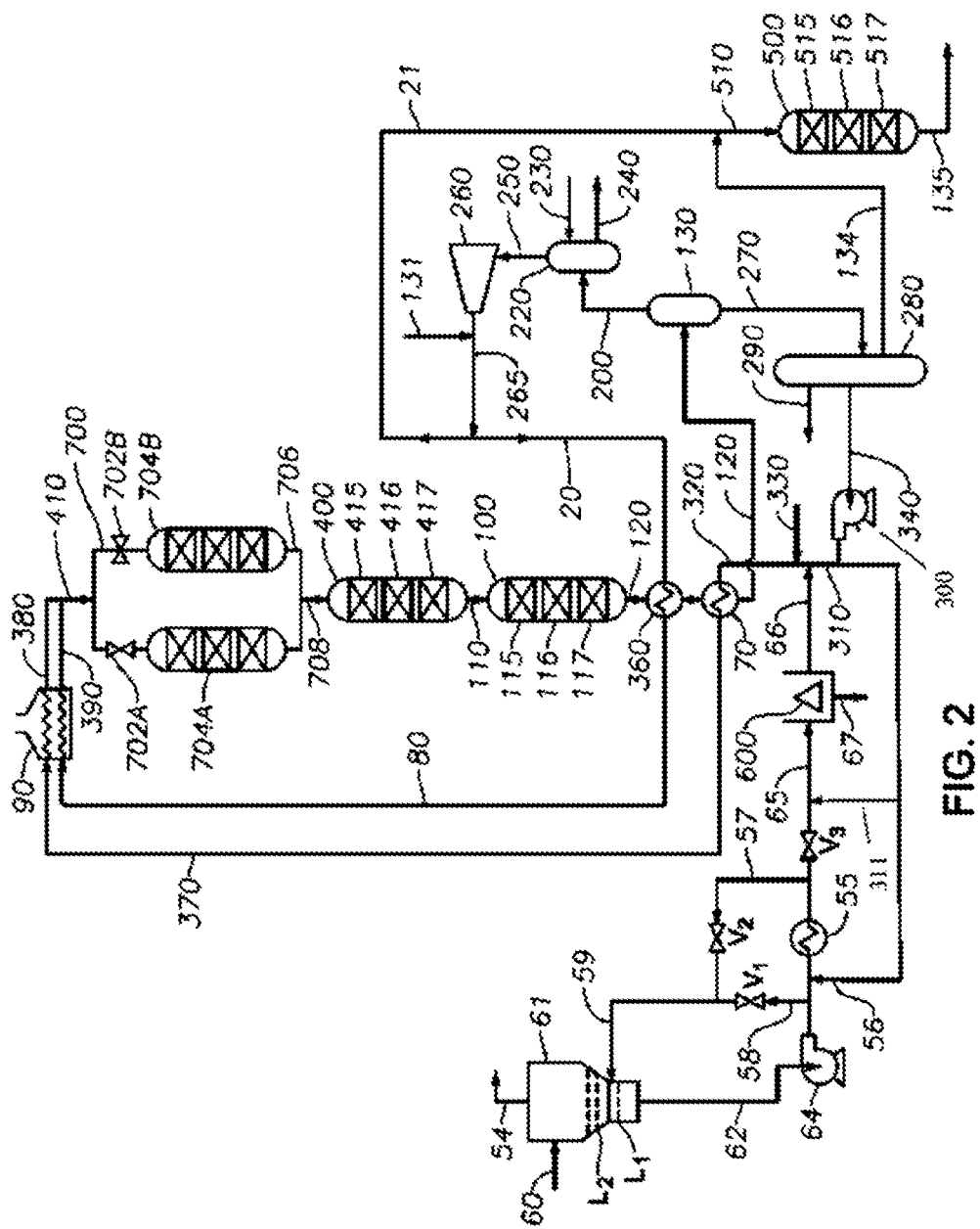
FIG. 2 shows a more detailed schematic of the tar processing method as disclosed herein.

Referring now to FIG. 1 and FIG. 2, the process flow of the tar and flash bottoms upgrading process is described in more detail.

The upgrading process includes steps of hydroprocessing, typically such that a later step of hydroprocessing is conducted under similar or more severe conditions than an earlier step of hydroprocessing. Thus, at least one stage of hydroprocessing is performed under "Pretreatment Hydroprocessing Conditions", to lower the reactivity of the tar or of the tar-utility fluid mixture. The pretreatment hydroprocessing is carried out before a stage of hydroprocessing that is carried out under Intermediate Hydroprocessing Conditions. The intermediate hydroprocessing typically effects the major part of hydrogenation and some desulfurizing reactions. Pretreatment Hydroprocessing Conditions are less severe than "Intermediate Hydroprocessing Conditions". For example, compared to Intermediate Hydroprocessing Conditions, Pretreatment Hydroprocessing Conditions utilize one or more of a lesser hydroprocessing temperature, a lesser hydroprocessing pressure, a greater feed (tar+utility fluid) WHSV, a greater pyrolysis tar WHSV, and a lesser molecular hydrogen consumption rate. Within the parameter ranges (T, P, WHSV, etc.) specified for Pretreatment Hydroprocessing Conditions, particular hydroprocessing conditions can be selected to achieve a desired 566° C.+ conversion, typically in the range of from 0.5 wt. % to 5 wt. % substantially continuously for at least ten days.

Optionally, the process includes at least one stage of retreatment hydroprocessing, especially to further lessen sulfur content of the intermediate hydroprocessed tar. Retreatment hydroprocessing is carried out under "Retreatment Hydroprocessing Conditions" after at least one stage of hydroprocessing under Intermediate Hydroprocessing Conditions. Typically, the retreatment hydroprocessing is carried out with little or no utility fluid. The Retreatment Hydroprocessing Conditions are typically more severe than the Intermediate Hydroprocessing Conditions, When a temperature is indicated for particular catalytic hydroprocessing conditions in a hydroprocessing zone, e.g., Pretreatment, Intermediate, and Retreatment Hydroprocessing Conditions, this refers to the average temperature of the hydroprocessing zone's catalyst bed (one half the difference between the bed's inlet and outlet temperature). When the hydroprocessing reactor contains more than one hydroprocessing zone (e.g., as shown in FIG. 2) the hydroprocessing temperature is the average temperature in the hydroprocessing reactor, e.g., (one half the difference between the temperature of the most upstream catalyst bed's inlet and the temperature of the most downstream catalyst bed's outlet temperature).

Total pressure in each of the hydroprocessing stage is typically regulated to maintain a flow of pyrolysis tar, pyrolysis tar composition, pretreated tar, hydroprocessed tar, and retreated tar from one hydroprocessing stage to the next, e.g., with little or need for inter-stage pumping. Although it is within the scope of the invention for any of the hydroprocessing stages to operate at an appreciably greater pressure than others, e.g., to increase hydrogenation of any thermally-cracked molecules, this is not required. The invention can be carried out using a sequence of total pressure from stage-to-stage that is sufficient (i) to achieve the desired amount of tar hydroprocessing, (ii) to overcome any pressure drops across the stages, and (iii) to maintain tar flow to the process, from stage-to-stage within the process, and away from the process.

A: Thermal Treatment to Reduce Tar Reactivity

Formation of coke precursors during pyrolysis tar hydroprocessing leads to an increase in hydroprocessing reactor fouling. It has been observed that coke precursor formation results mainly from two reactions: inadequate hydrogenation of thermally cracked molecules and polymerization of highly reactive molecules in the pyrolysis tar. Although inadequate hydrogenation can be addressed by increasing the reactor pressure, the polymerizations of highly reactive molecules depend not only on pressure, but mainly on other conditions such as temperature and weight hourly space velocity ("WHSV"). Accordingly, certain aspects of the invention relate to carrying out pyrolysis tar hydroprocessing with less reactor fouling by (i) thermally-treating the tar which produces a tar composition having a lesser reactivity, (ii) hydroprocessing of the thermally-treated tar in the presence of a utility fluid to form a pretreater effluent, and (iii) hydroprocessing of the pretreater effluent to produce a hydroprocessed tar. It is noted that the flash bottoms can be included in the process train at any convenient locations. For example, the thermally-treated tar can optionally be hydroprocessed as part of a mixture of thermally-treated tar and flash bottoms in the presence of the utility fluid. As another example, the flash bottoms can be added to the pretreater effluent to form the mixture of (pre-treated) pyrolysis tar, utility fluid, and flash bottoms. Still another option can be to mix the flash bottoms with hydrotreated pyrolysis tar and utility fluid prior to second stage hydrotreating.

Certain aspects of the invention include thermally-treating a tar to produce a thermally-treated tar (a tar composition, e.g., a pyrolysis tar composition), combining the tar composition with utility fluid to produce a tar-fluid mixture, hydroprocessing the tar-fluid mixture under Pretreatment Hydroprocessing Conditions to produce a pretreater effluent, and hydroprocessing at least part of the pretreatment effluent under Intermediate Hydroprocessing Conditions to produce a hydroprocessor effluent comprising hydroprocessed tar. For example, the process can include thermally treating a SCT to produce a SCT composition, combining the SCT composition with a specified amount of a specified utility fluid to produce a tar-fluid mixture, hydroprocessing the tar-fluid mixture in a pretreatment reactor under Pretreatment Hydroprocessing Conditions, to produce a pretreater effluent, and hydroprocessing at least a portion of the pretreater effluent under Intermediate Hydroprocessing. Optionally, flash bottoms can be combined with the pyrolysis tar (such as SCT) at any convenient location within the above processing train.

Thermally treating a tar to reduce its reactivity can be accomplished in a cold tar recycling process with some minor modification, e.g. by reducing the flow of cold tar back into the process as described further below. Thermal treatment kinetics suggests that a reaction temperature of 200° C. to 300° C. with a residence time of a few minutes, e.g. 2 min., to >30 min., are effective in reducing tar reactivity. The higher the thermal treating temperature, the shorter the thermal treatment reaction time or residence time can be. For example, at 300° C., a residence time of 2-5 minutes may be adequate. At 250° C., a residence time of ~30 min gives similar reduction in reactivity. Pressure has little impact on thermal treatment kinetics and so the thermal treatment can be performed at ambient pressure or at the pressure of the outlet of the tar knockout process feeding the presently disclosed tar upgrading process.

In certain aspects, the thermal treatment is carried out at a temperature in the range of from 20° C. to 300° C., or from 200° C. to 250° C., or from 225° C. to 275° C., for a time in the range of from 2 to 30 minutes, e.g., 2 to 5 minutes, or 5 to 20 minutes or 10 to 20 minutes. At higher temperatures, the heat soaking can be suitably be performed for a shorter period of time.

Although it is typical to carry out SCT thermal treatment in one or more tar drums and related piping, the invention is not limited thereto For example, when the thermal treatment includes heat soaking, the heat soaking can be carried out at least in part in one or more soaker drums and/or in vessels, conduits, and other equipment (e.g. fractionators, water-quench towers, indirect condensers) associated with, e.g., (i) separating the pyrolysis tar from the pyrolysis effluent and/or (ii) conveying the pyrolysis tar to hydroprocessing. The location of the thermal treatment is not critical. The thermal treatment can be carried out at any convenient location, e.g., after tar separation from the pyrolysis effluent and before hydroprocessing, such as downstream of a tar drum and upstream of mixing the thermally treated tar with utility fluid.

In certain aspects, the thermal treatment is carried out as illustrated schematically in FIG. 2. As shown, quenched effluent from a steam cracker furnace facility is conducted via line 60 to a tar knock out drum 61. Cracked gas is removed from the drum via line 54. SCT condenses in the lower region of the drum (the boot region as shown), and a withdrawn stream of SCT is conducted away from the drum via line 62 to pump 64. A filter (not shown in the figure) for removing large solids, e.g. ≥10,000 μm diameter, from the SCT stream may be included in the line 62. After pump 64, a first recycle stream 58 and a second recycle stream 57 are diverted from the withdrawn stream. The first and second recycle streams are combined as recycle to drum 61 via line 59. One or more heat exchangers 55 is provided for cooling the SCT in lines 57 (shown) and 65 (not shown) e.g., against water. Line 56 provides an optional flux of utility fluid if needed. Valves $V_1$, $V_2$, and $V_3$ regulate the amounts of the withdrawn stream that are directed to the first recycle stream, the second recycle stream, and a stream conducted to solids separation, represented here by centrifuge 600, via line 65. Lines 58, 59, and 62 can be insulated to maintain the temperature of the SCT within the desired temperature range for the thermal treatment. The thermal treatment time $t_{HS}$ can be increased by increasing SCT flow through valves $V_1$ and $V_2$, which raises the SCT liquid level in drum 61 from an initial level, e.g., $L_1$, toward $L_2$.

Thermally-treated SCT is conducted through valve $V_3$ and via line 65 toward a solids removal facility, here a centrifuge 600, and then the liquid fraction from the centrifuge is conveyed via line 66 to a hydroprocessing facility comprising at least one hydroprocessing reactor. Solids removed from the tar are conducted away from the centrifuge via line 67. In the aspects illustrated in FIG. 2 using a representative SCT such as SCT1, the average temperature $T_{HS}$ of the SCT during thermal treatment in the lower region of tar drum (below $L_2$) is in the range of from 200° C. to 275° C., and heat exchanger 55 cools the recycle portion of the second stream to a temperature in the range of from 60° C. to 80° C. Time $t_{HS}$ can be, e.g., ≥10 min., such as in the range of from 10 min. to 30 min., or 15 min. to 25 min.

In continuous operation, the SCT conducted via line 65 typically comprises ≥50 wt. % of SCT available for processing in drum 61, such as SCT, e.g., ≥75 wt. %, such as ≥90 wt. %. In certain aspects, substantially all of the SCT available for hydroprocessing is combined with the specified amount of the specified utility fluid to produce a tar-fluid mixture which is conducted to hydroprocessing. Depending, e.g., on hydroprocessor capacity limitations, a portion of the SCT in line 65 or line 66 can be conducted away, such as for storage or further processing, including storage followed by hydroprocessing (not shown).

B: Centrifugation to Remove Solids Having a Size of about 25 µm or Larger

Tar such as SCT, contains 1000 ppmw to up to 4000 ppmw or even greater amounts of insolubles in the form of particulate solids. The particles are believed to have two origins. The first source is coke fines arising from pyrolysis. The coke fines from pyrolysis typically have very low hydrogen content, e.g., ≤3 wt. %, and a density ≥1.2 g/ml. The second source is from tar oligomerization or polymer coke. There are multiple points in the steam cracking process that polymer coke can form and enter the tar stream. For example, some steam crackers have significant fouling issues in a primary fractionator. The source of this fouling is believed to result from polymers forming in the fractionator tower via vinyl aromatics oligomerization at temperatures ≤150° C. Although it is conventional to periodically remove foulant from fractionator trays by hydro-blasting, some foulant becomes entrained in the tar stream via the quench oil recycle. This foulant, identified herein as polymer coke, is richer in hydrogen content, e.g., ≥5 wt. %, and typically has lower density, e.g., ≤1.1 g/ml, than pyrolysis coke fines.

In addition to the two main sources of coke fines, a tertiary fines source is believed to result from the specified heat soaking. Accordingly it is within the scope of the invention to carry out the heat soaking under relatively mild conditions (lower temperature, shorter time durations) within the specified heat soaking conditions. Compared to solids produced by other pathways, solids produced during tar heat soaking are believed to have a relatively large hydrogen content (e.g., ≥5 wt. %), and are believed to have much smaller particle sizes, e.g., ≤25 µm.

Figure 4:
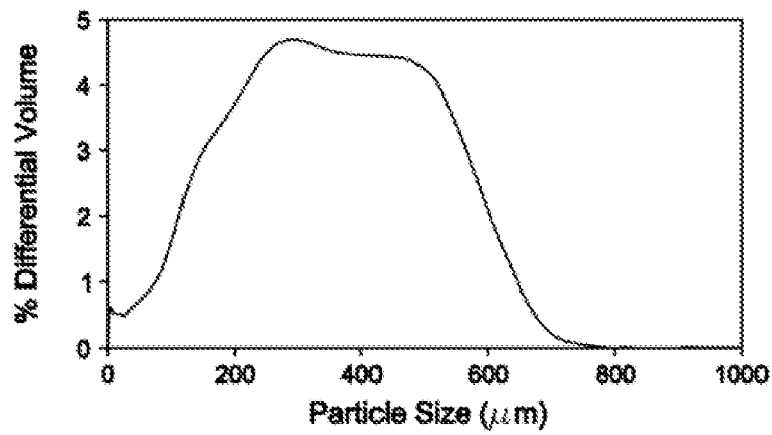
FIG. 4 shows a typical particle size distribution for tar solids.

FIG. 4 shows a typical particle size distribution of tar solids. Particle size ranges from submicron to 800 µm or larger. In addition to the indicated thermal treatment, the pyrolysis tar is optionally treated to remove solids, particularly those having a particle size ≥10,000 µm. Solids can be removed before and/or after the thermal treatment. For example, the tar can be thermally-treated and combined with utility fluid to form a tar-fluid mixture from which the solids are removed. Alternatively or in addition, solids can be removed before or after any hydroprocessing stage. Although it is not limited thereto, the invention is compatible with use of conventional solid-removal technology such as that disclosed in U.S. Patent Application Publication No. 2015-0361354, which is incorporated by reference herein in its entirety.

In certain aspects, centrifugation (typically assisted by the utility fluid) is used for solids removal. For example, solids can be removed from the tar-fluid mixture at a temperature in the range of from 80° C. to 100° C. using a centrifuge. Any suitable centrifuge may be used, including those industrial-scale centrifuges available from Alfa Laval. The feed to the centrifuge may be a tar-fluid mixture comprising utility fluid and a tar composition (thermally-treated tar).

The amount of utility fluid is controlled such that the density of tar-fluid mixture at the centrifugation temperature, typically 50° C. to 120° C., or from 60° C. to 100° C., or from 60° C. to 90° C., is substantially the same as the desired feed density (1.02 g/ml to 1.06 g/ml at 80° C. to 90° C.). Typically, the utility fluid comprises, consists essentially of, or even consists of a mid-cut stream separated from a product of tar hydroprocessing. For example, all or a part of the mid-cut stream can be obtained from the downstream utility fluid recovery step of the presently disclosed process. The amount of utility fluid in the tar-fluid mixture is typically around 40 wt. % for a wide variety of pyrolysis tars, but can vary, for example from 20% to 60%, so as to provide the feed at a desired density, which may be pre-selected.

Continuing with FIG. 2, the thermally treated tar stream is conducted via line 65 through valve $V_3$ into a centrifuge 600. The liquid product is conducted via line 66 storage and/or the specified hydroprocessing. At least a portion of solids removed during centrifuging are conducted away via line 67, e.g., for storage or further processing.

The centrifuge typically operates at 2000×g to 6000×g at a temperature in the range of from 50° C. to 125° C., or from 70° C. to 110° C., or from 70° C. to 100° C. or from 70° C. to 95° C., where "g" is acceleration due to gravity. A higher centrifugation temperature tends to allow for cleaner separation of solids from the tar. When the feed to the centrifuge contains 20-50 wt. % solids, the centrifugation is typically performed at a temperature in the range of from 80° C. to 100° C. and a force of 2000×g to 6000×g.

Figure 5:
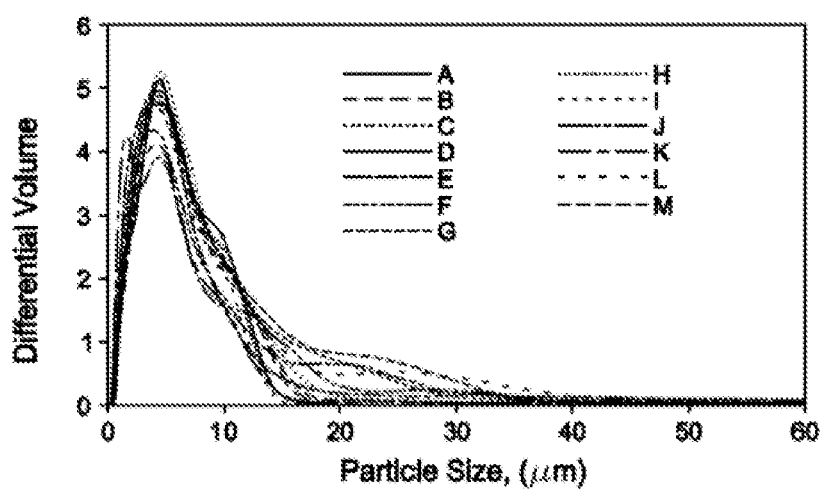
FIG. 5 shows the particle size distribution in effluent from centrifugation of representative heat soaked tar samples.

The centrifuge is effective in removing particulates from the feed, particularly those of size ≥25 µm. The amount of particles ≥25 µm in the centrifuge effluent is typically less than 2 vol. % of all the particles. Tar, e.g., pyrolysis tar, such as SCT, typically contains a relatively large concentration of particles having a size <25 µm. For representative tars, the amount of solids generally ranges from 100 ppm to 170 ppm with a median concentration of ~150 ppm. As shown in FIG. 5 for repetitive SCTs A-M, a majority of the solids in each tar is in the form of particles having a size of <25 µm. Particles of such small size appear to be carried through the instant process without significant fouling.

Following the removal of solids, the tar stream is subject to additional processes to further lower the reactivity of the tar before hydroprocessing under Intermediate Hydroprocessing Conditions. These additional processes are collectively called "pretreatment" and include pretreatment hydroprocessing in a guard reactor and then further additional hydroprocessing in an intermediate hydroprocessing reactor.

D: Pretreatment in a Guard Reactor to Decrease Tar Reactivity and Decrease Fouling by any Particulates in Centrifuge Effluent to Lessen Pretreater Fouling.

Figure 8:
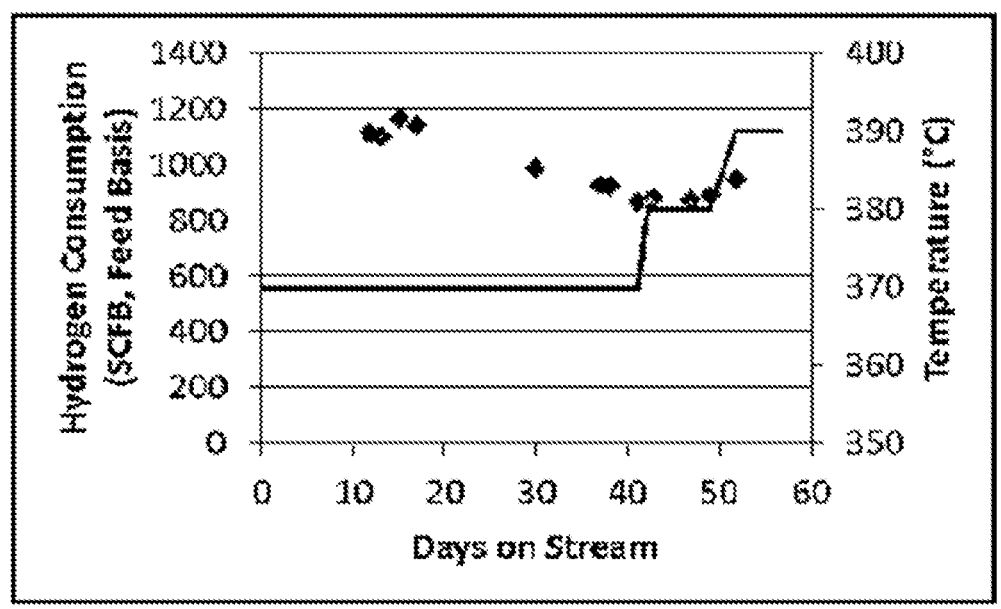
FIG. 8 shows hydrogen consumption during hydroprocessing at various temperatures of a mixed feed including steam cracked tar and pre-pyrolysis flash bottoms.

A guard reactor (e.g. 704A, 704B in FIG. 2) is used to protect downstream reactors from fouling from reactive olefins and solids. In a preferred configuration (illustrated in FIGS. 1 and 2), two guard reactors are run in alternating mode—one on-line with the other off-line. When one of the guard reactors exhibits an undesirable increase in pressure drop, it is brought off-line so that it can be serviced and restored to condition for continued guard reactor operation. Restoration while off-line can be carried out, e.g., by replacing reactor packing and replacing or regenerating the reactor's internals, including catalyst. A plurality of (online) guard reactors can be used. Although the guard reactors can be arranged serially (e.g. as shown in FIG. 8), it is more typical for at least two guard reactors to be arranged in parallel, as in FIG. 2. For example, two sets of the series guard reactors of FIG. 8 can be arranged in parallel.

Referring again to FIG. 2, a thermally treated tar composition having solids >25 µm substantially removed is conducted via line 66 for processing in at least one guard reactor. This composition is combined with recovered utility fluid supplied via line 310 to produce the tar-fluid mixture in line 320. Additionally or alternately, recovered utility fluid can be supplied via line 311 to line 65 after valve $V_3$.

Additionally or alternately, recovered utility fluid can be supplied as optional additional flux via line 56. Optionally, a supplemental utility fluid and/or flash bottoms, may be added via conduit 330. A first pre-heater 70 preheats the tar-fluid mixture (which typically is primarily in liquid phase), and the pre-heated mixture is conducted to a supplemental pre-heating stage 90 via conduit 370. Supplemental pre-heater stage 90 can be, e.g., a fired heater. Recycled treat gas is obtained from conduit 265 and, if necessary, is mixed with fresh treat gas, supplied through conduit 131. The treat gas is conducted via conduit 20 through a second pre-heater 360, before being conducted to the supplemental pre-heat stage 90 via conduit 80. Fouling in the main hydroprocessing reactor 110 can be decreased by increasing feed pre-heater duty in pre-heaters 70 and 90.

Continuing with reference to FIG. 2, the pre-heated mixture (tar-fluid, tar-flash bottoms, or tar-flash bottoms-fluid) from line 380 is combined with the pre-heated treat gas from line 390 and then conducted via line 410 to guard reactor inlet manifold 700. Mixing means (not shown) can be utilized for combining the pre-heated mixture with the pre-heated treat gas in guard reactor inlet manifold 700. The guard reactor inlet manifold directs the combined tar-fluid mixture and treat gas to online guard reactors, e.g. 704A, via an appropriate configuration of guard reactor inlet valves 702A, shown open, and 702B shown closed. An offline guard reactor 704B is illustrated, which can be isolated from the pretreatment inlet manifold by the closed valve 702B and a second isolation valve (not shown) downstream of the outlet of reactor 704B. On-line reactor 704A can also be brought off-line, and isolated from the process, when reactor 704B is brought on-line. Reactors 704A and 704B are typically brought off-line in sequence (one after the other) so that one 704A or 704B is on-line while the other is off-line, e.g., for regeneration. Effluent from the online guard reactor(s) is conducted to further downstream processes via a guard reactor outlet manifold 706 and line 708.

F: Additional Pretreatment Hydroprocessing in a Pretreatment Hydroprocessing Reactor A further pretreatment hydroprocessing is applied downstream from the guard reactor to lessen foulant accumulation in the first stage main reactor. Certain forms of the pretreatment hydroprocessing reactor will now be described with continued reference to FIG. 2. In these aspects, the tar-fluid mixture is hydroprocessed under the specified Pretreatment Hydroprocessing Conditions described below to produce a pretreatment hydroprocessor (pretreater) effluent. The invention is not limited to these aspects, and this description is not meant to foreclose other aspects within the broader scope of the invention.

Pretreatment Hydroprocessing Conditions

The SCT composition is combined with utility fluid and optionally with flash bottoms to produce a tar-fluid mixture or a tar-flash bottoms-fluid mixture that is hydroprocessed in the presence of molecular hydrogen under Pretreatment Hydroprocessing Conditions to produce a pretreatment hydroprocessing reactor effluent. The pretreatment hydroprocessing is typically carried out in at least one hydroprocessing zone located in at least one pretreatment hydroprocessing reactor. The pretreatment hydroprocessing reactor can be in the form of a conventional hydroprocessing reactor, but the invention is not limited thereto.

The pretreatment hydroprocessing is carried out under Pretreatment Hydroprocessing Conditions, to further lower the reactivity of the tar stream (tar-utility fluid stream or tar-flash bottoms-utility fluid stream) after the thermal treatment (e.g. by heat soaking) step and an initial stage of pretreatment in the guard reactor. Pretreatment Hydroprocessing Conditions include temperature $T_{PT}$, total pressure $P_{PT}$, and space velocity $WHSV_{PT}$. One or more of these parameters are typically different from those of the intermediate hydroprocessing ($T_I$, $P_I$, and $WHSV_I$). Pretreatment Hydroprocessing Conditions typically include one or more of $T_{PT} \geq 150°$ C., e.g., $\geq 200°$ C. but less than $T_I$ (e.g., $T_{PT} \leq T_I - 10°$ C., such as $T_{PT} \leq T_I - 25°$ C., such as $T_{PT} \leq T_I - 50°$ C.), a total pressure $P_{PT}$ that is $\geq 8$ MPa but less than Pi, $WHSV_{PT} \geq 0.3$ hr$^{-1}$ and greater than $WHSV_I$ (e.g., $WHSV_{PT} \geq WHSV_I + 0.01$ hr$^{-1}$, such as $\geq WHSV_I + 0.05$ hr$^{-1}$, or $\geq WHSV_I + 0.1$ hr$^{-1}$, or $\geq WHSV_I + 0.5$ hr$^{-1}$, or $\geq WHSV_I + 1$ hr$^{-1}$, or $\geq WHSV_I + 10$ hr$^{-1}$, or more), and a molecular hydrogen consumption rate that in the range of from 150 standard cubic meters of molecular hydrogen per cubic meter of the pyrolysis tar (S m$^3$/m$^3$) to about 400 S m$^3$/m$^3$ (845 SCF/B to 2250 SCF/B) but less than that of intermediate hydroprocessing. The Pretreatment Hydroprocessing Conditions typically include $T_{PT}$ in the range of from 260° C. to 300° C.; $WHSV_{PT}$ in the range of from 1.0 hr$^{-1}$ to 4.0 hr$^{-1}$, e.g., 2 hr$^{-1}$ to 3 hr$^{-1}$; a $P_{PT}$ in the range of from 6 MPa to 13.1 MPa; a molecular hydrogen supply rate in a range of about 600 standard cubic feet per barrel of tar-fluid mixture (SCF/B) (107 S m$^3$/m$^3$) to 1000 SCF/B (178 S m$^3$/m$^3$), and a molecular hydrogen consumption rate in the range of from 300 standard cubic feet per barrel of the pyrolysis tar composition in the tar-fluid mixture (SCF/B) (53 S m$^3$/m$^3$) to 400 SCF/B (71 S m$^3$/m$^3$). Using the specified Pretreatment Hydroprocessing Conditions results in an appreciably longer hydroprocessing duration without significant reactor fouling (e.g., as evidenced by no significant increase in hydroprocessing reactor pressure drop) than is the case when hydroprocessing a substantially similar tar-fluid mixture under more severe conditions, e.g., under Intermediate Hydroprocessing Conditions (described further below). The duration of pretreatment hydroprocessing without significantly fouling is typically at least 10 times longer than would be the case if more severe hydroprocessing conditions were used, e.g., $\geq 100$ times longer, such as $\geq 1000$ times longer. Although the pretreatment hydroprocessing can be carried out within one pretreatment hydroprocessing reactor, it is within the scope of the invention to use two or more reactors. For example, first and second pretreatment reactors can be used, where the first pretreatment hydroprocessing reactor (such as a guard reactor) operates at a lower temperature and greater space velocity within the Pretreatment Hydroprocessing Conditions than the second pretreatment hydroprocessing reactor. For example, if a guard reactor is used as a first pretreatment reactor, the conditions can include a guard reactor temperature in the range of from 240° C. to 320° C.; a guard WHSV in the range of from 2.0 hr$^{-1}$ to 10 hr$^{-1}$; a guard pressure in the range of from 6 MPa to 13.1 MPa; a molecular hydrogen supply rate in a range of about 600 standard cubic feet per barrel of tar-fluid mixture (SCF/B) (107 S m$^3$/m$^3$) to 1000 SCF/B (178 S m$^3$/m$^3$), and a molecular hydrogen consumption rate in the range of from 300 standard cubic feet per barrel of the pyrolysis tar composition in the tar-fluid mixture (SCF/B) (53 S m³/m³) to 400 SCF/B (71 S m³/m³).

Pretreatment hydroprocessing is carried out in the presence of hydrogen, e.g., by (i) combining molecular hydrogen with the tar-containing mixture upstream of the pretreatment hydroprocessing, and/or (ii) conducting molecular hydrogen to the pretreatment hydroprocessing reactor in one or more conduits or lines. Although relatively pure molecular hydrogen can be utilized for the hydroprocessing, it is generally desirable to use a "treat gas" which contains sufficient molecular hydrogen for the pretreatment hydroprocessing and optionally other species (e.g., nitrogen and light hydrocarbons such as methane) which generally do not adversely interfere with or affect either the reactions or the products. The treat gas optionally contains ≥about 50 vol. % of molecular hydrogen, e.g., ≥75 vol. %, such as ≥90 wt. %, based on the total volume of treat gas conducted to the pretreatment hydroprocessing stage.

Typically, the pretreatment hydroprocessing in at least one hydroprocessing zone of the pretreatment hydroprocessing reactor is carried out in the presence of a catalytically-effective amount of at least one catalyst having activity for hydrocarbon hydroprocessing. Conventional hydroprocessing catalysts can be utilized for pretreatment hydroprocessing, such as those specified for use in resid and/or heavy oil hydroprocessing, but the invention is not limited thereto. Suitable pretreatment hydroprocessing catalysts include bulk metallic catalysts and supported catalysts. The metals can be in elemental form or in the form of a compound. Typically, the catalyst includes at least one metal from any of Groups 5 to 10 of the Periodic Table of the Elements (tabulated as the Periodic Chart of the Elements, The Merck Index, Merck & Co., Inc., 1996). Examples of such catalytic metals include, but are not limited to, vanadium, chromium, molybdenum, tungsten, manganese, technetium, rhenium, iron, cobalt, nickel, ruthenium, palladium, rhodium, osmium, iridium, platinum, or mixtures thereof. Conventional catalysts can be used, but the invention is not limited thereto.

In certain aspects, the catalyst has a total amount of Groups 5 to 10 metals per gram of catalyst of at least 0.0001 grams, or at least 0.001 grams or at least 0.01 grams, in which grams are calculated on an elemental basis. For example, the catalyst can comprise a total amount of Group 5 to 10 metals in a range of from 0.0001 grams to 0.6 grams, or from 0.001 grams to 0.3 grams, or from 0.005 grams to 0.1 grams, or from 0.01 grams to 0.08 grams. In particular aspects, the catalyst further comprises at least one Group 15 element. An example of a preferred Group 15 element is phosphorus. When a Group 15 element is utilized, the catalyst can include a total amount of elements of Group 15 in a range of from 0.000001 grams to 0.1 grams, or from 0.00001 grams to 0.06 grams, or from 0.00005 grams to 0.03 grams, or from 0.0001 grams to 0.001 grams, in which grams are calculated on an elemental basis.

Typically, the tar-containing mixture is primarily in the liquid phase during the pretreatment hydroprocessing. For example, ≥75 wt. % of the tar-containing mixture is in the liquid phase during the hydroprocessing, such ≥90 wt. %, or ≥99 wt. %. The pretreatment hydroprocessing produces a pretreater effluent which at the pretreatment reactor's outlet comprises (i) a primarily vapor-phase portion including unreacted treat gas, primarily vapor-phase products derived from the treat gas and the tar-containing mixture, e.g., during the pretreatment hydroprocessing, and (ii) a primarily liquid-phase portion which includes pretreated tar-fluid mixture, unreacted utility fluid, and products, e.g., cracked products, of the pyrolysis tar and/or utility fluid as may be produced during the pretreatment hydroprocessing. In aspects where flash bottoms are combined with the tar prior to pretreatement, the primarily liquid-phase portion can also containing pretreated flash bottoms.

Certain aspects of the pretreatment hydroprocessing will now be described in more detail with respect to FIG. 2. As shown in the figure, guard reactor effluent flows from the guard reactor via line 708 to the pretreatment reactor 400. The guard reactor effluent can be mixed with additional treat gas (not shown); the additional treat gas can also be pre-heated. Mixing means (not shown) can be utilized for combining the guard reactor effluent with the pre-heated treat gas in pretreatment reactor 400, e.g., one or more gas-liquid distributors of the type conventionally utilized in fixed bed reactors.

The pretreatment hydroprocessing is carried out in the presence of hydroprocessing catalyst(s) located in at least one catalyst bed 415. Additional catalyst beds, e.g., 416, 417, etc., may be connected in series with catalyst bed 415, optionally with intercooling using treat gas from conduit 20 being provided between beds (not shown). Pretreater effluent is conducted away from pretreatment reactor 400 via conduit 110.

In certain aspects, the following Pretreatment Hydroprocessing Conditions are used: $T_{PT}$ in the range of from 250° C. to 325° C., or 275° C. to 325° C., or 260° C. to 300° C.; or 280° C. to 300° C.; $WHSV_{PT}$ in the range of from 1 hr⁻¹ to 4 hr⁻¹, or 2 hr⁻¹ to 3 hr⁻¹, $P_{PT}$ in the range of from 1000 psia (~6.90 MPa-a) to 1600 psia (~11.0 MPa-a), e.g., 1300 psia (~9.0 MPa-a) to 1500 psia (~10.3 MPa-a); and a treat gas rate in the range of from 600 SCF/B (~105 m³/m³) to 1000 SCF/B (178 m³/m³), or 800 SCF/B (~140 m³/m³) to 900 SCF/B (~160 m³/m³) (on a feed basis).

G: Intermediate Hydroprocessing for Hydrogenating and Desulfurizing in a Main Hydroprocessing Reactor Referring again to FIG. 1, a main hydroprocessing reactor G is used for carrying out most of the desired tar-conversion reactions, including hydrogenating and first desulfurizing reactions. In some aspects, main hydroprocessing reactor G can also be used for carrying out at least a portion of upgrading for flash bottoms included within the tar-containing mixture. The main hydroprocessing reactor adds approximately 800 SCF/B (~140 m³/m³) to 2000 SCF/B (356 m³/m³), of molecular hydrogen to the feed, e.g., approximately 1000 SCF/B (178 m³/m³) to 1500 SCF/B (~265 m³/m³), most of which is added to tar rather than to the utility fluid. The key reactions occurring in the main hydroprocessing reactor are summarized in the following scheme.

Scheme. Simplified reaction shcemes summarizing main reactions occurring in the main hydroprocessing reactor
1)
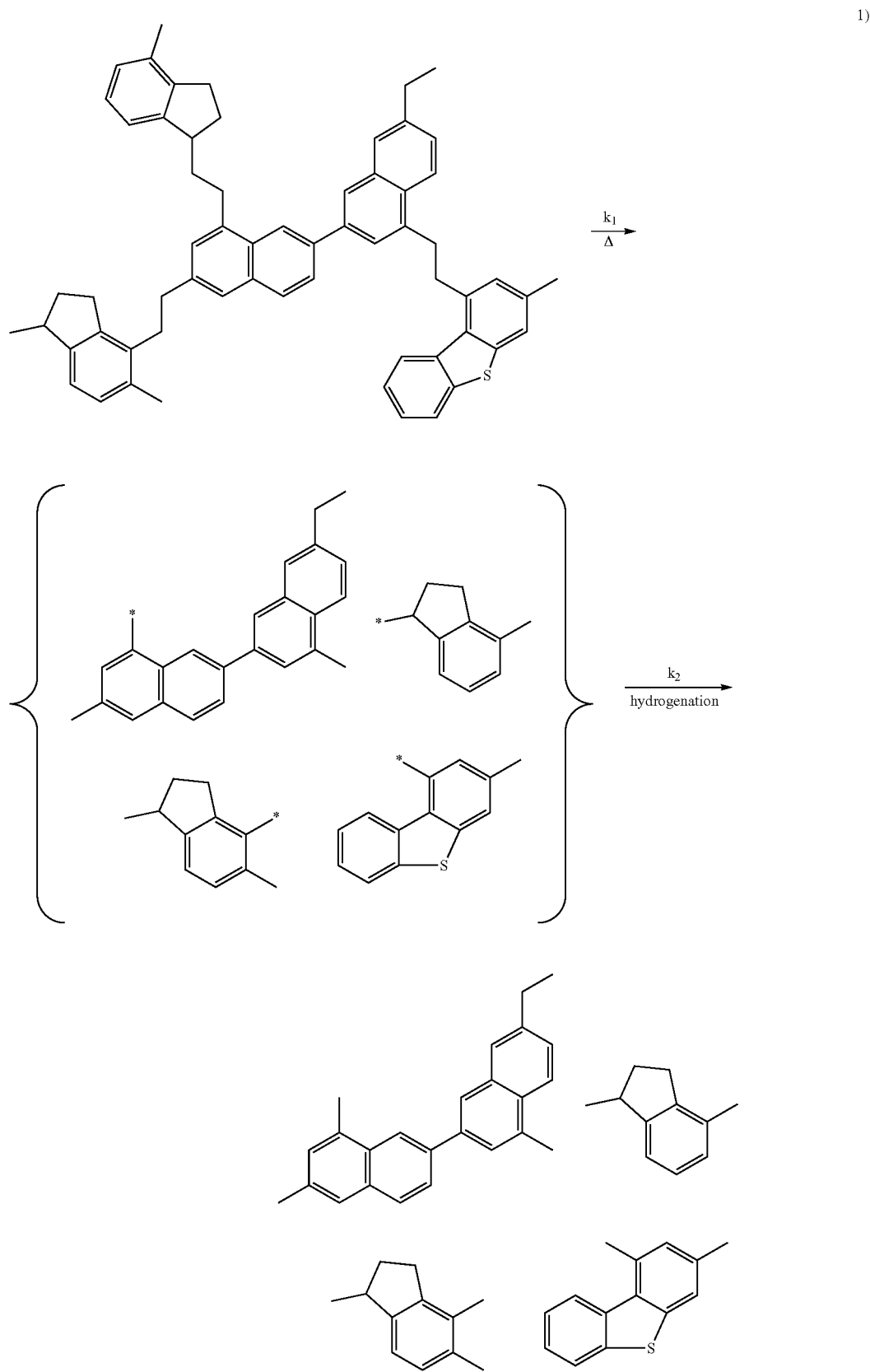

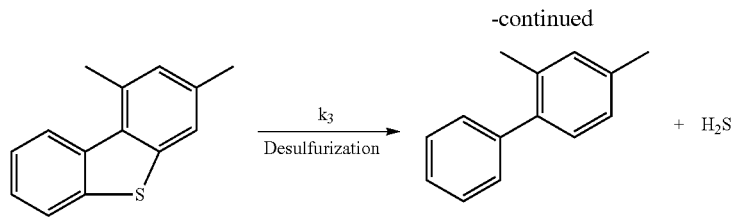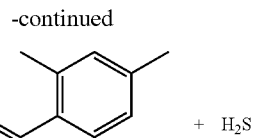

The first set of reactions (a first tar conversion) are the most important ones in reducing the size of tar molecules, particularly the size of TH. Some reduction in the size of molecules in the optional flash bottoms fraction can also occur. The first set of reactions can lead to a significant reduction in the tar's 1050° F.+ (566° C.+) fraction and/or the flash bottoms 1050° F.+ (566° C.+) fraction. The second set of reactions (hydrodesulfurization or HDS), desulfurizes the tar and/or the flash bottoms. For SCT, few alkyl chains survive the steam cracking—most molecules are dealkylated. As a result, the sulfur-containing molecules, e.g., benzothiophene or dibenzothiophenes, generally contain exposed sulfurs. These sulfur-containing molecules are readily removed using one or more conventional hydroprocessing catalysts, but the invention is not limited thereto. Suitable conventional catalysts include those comprising one or more of Ni, Co, and Mo on a support, such as aluminate ($Al_2O_3$).

A third set of reactions (a second tar conversion) can be used, and these typically include hydrogenation followed by ring opening to further reduce the size of tar molecules (and optionally flash bottoms molecules). A fourth set of reactions (aromatics saturation) can also be used. Adding hydrogen to the product of the first, second, or third reactions has been found to improve the quality of the hydroprocessed tar.

In certain aspects, intermediate hydroprocessing of at least a portion the pretreated tar-fluid mixture is carried out in reactor G under Intermediate Hydroprocessing Conditions, e.g., to effect at least hydrogenation and desulfurization. This intermediate hydroprocessing will now be described in more detail.

Intermediate Hydroprocessing of the Pretreated Tar-Containing Mixture

In certain aspects not shown in FIG. 2, liquid and vapor portions are separated from the pretreater effluent. The vapor portion is upgraded to remove impurities such as sulfur compounds and light paraffinic hydrocarbon, and the upgraded vapor can be re-cycled as treat gas for use in one or more of hydroprocessing reactors 704, 400, 100 and 500. The separated liquid portion can be conducted to a hydroprocessing stage operating under Intermediate Hydroprocessing Conditions to produce a hydroprocessed tar. Additional processing of the liquid portion, e.g., solids removal, can be used upstream of the intermediate hydroprocessing.

In other aspects, as shown in FIG. 2, the entire effluent of the pretreater is conducted away from reactor 400 via line 110 for intermediate hydroprocessing of the entire pretreatment hydroprocessing effluent in a main hydroprocessing reactor 100 (Reactor G in FIG. 1). It will be appreciated by those skilled in the art, that for a wide range of conditions within the Pretreatment Hydroprocessing Conditions and for a wide range of tar-containing mixtures, sufficient molecular hydrogen will remain in the pretreatment hydroprocessing effluent for the intermediate hydroprocessing of the pretreated tar-containing mixture in main hydroprocessing reactor 100 without need for supplying additional treat gas, e.g., from the conduit 20.

Typically, the intermediate hydroprocessing in at least one hydroprocessing zone of the main hydroprocessing reactor is carried out in the presence of a catalytically-effective amount of at least one catalyst having activity for hydrocarbon hydroprocessing. The catalyst can be selected from among the same catalysts specified for use in the pretreatment hydroprocessing. For example, the intermediate hydroprocessing can be carried out in the presence of a catalytically effective amount hydroprocessing catalyst(s) located in at least one catalyst bed 115. Additional catalyst beds, e.g., 116, 117, etc., may be connected in series with catalyst bed 115, optionally with intercooling using treat gas from conduit 60 being provided between beds (not shown). The intermediate hydroprocessed effluent is conducted away from the main hydroprocessing reactor 100 via line 120.

The intermediate hydroprocessing is carried out in the presence of hydrogen, e.g., by one or more of (i) combining molecular hydrogen with the pretreatment effluent upstream of the intermediate hydroprocessing (not shown), (ii) conducting molecular hydrogen to the main hydroprocessing reactor in one or more conduits or lines (not shown), and (iii) utilizing molecular hydrogen (such as in the form of unreacted treat gas) in the pretreatment hydroprocessing effluent.

Typically, the Intermediate Hydroprocessing Conditions include $T_I > 400°$ C., e.g., in the range of from 300° C. to 500° C., such as 350° C. to 430° C., or 350° C. to 420° C., or 360° C. to 420° C., or 360° C. to 410° C.; and a $WHSV_I$ in the range of from 0.3 $hr^{-1}$ to 20 $hr^{-1}$ or 0.3 $hr^{-1}$ to 10 $hr^{-1}$, based on the weight of the pretreated tar-containing mixture subjected to the intermediate hydroprocessing. It is also typical for the Intermediate Hydroprocessing Conditions to include a molecular hydrogen partial pressure during the hydroprocessing ≥8 MPa, or ≥9 MPa, or ≥10 MPa, although in certain aspects it is ≤14 MPa, such as ≤13 MPa, or ≤12 MPa. For example, Pi can be in the range of from 6 MPa to 13.1 MPa. Generally, $WHSV_I$ is ≥0.5 $hr^{-1}$, such as ≥1.0 $hr^{-1}$, or alternatively ≤5 $hr^{-1}$, e.g., ≤4 $hr^{-1}$, or ≤3 $hr^{-1}$. The amount of molecular hydrogen supplied to a hydroprocessing stage operating under Intermediate Hydroprocessing Conditions is typically in the range of from about 1000 SCF/B (standard cubic feet per barrel) (178 S $m^3/m^3$) to 10000 SCF/B (1780 S $m^3/m^3$), in which B refers to barrel of pretreated tar-containing mixture that is conducted to the intermediate hydroprocessing. For example, the molecular hydrogen can be provided in a range of from 3000 SCF/B (534 S $m^3/m^3$) to 5000 SCF/B (890 S $m^3/m^3$). The amount of molecular hydrogen supplied to hydroprocess the pretreated pyrolysis tar component of the pretreated tar-containing mixture is typically less than would be the case if the pyrolysis tar component was not pretreated and contained greater amounts of olefin, e.g., $C_{6+}$ olefin, such as vinyl aromatics. The molecular hydrogen consumption rate during Intermediate Hydroprocessing Conditions is typically in the range of 350 standard cubic feet per barrel (SCF/B, which is about 62 standard cubic meters/cubic meter (S m$^3$/m$^3$)) to about 1500 SCF/B (267 S m$^3$/m$^3$), where the denominator represents barrels of the pretreated pyrolysis tar, in the range of about 1000 SCF/B (178 S m$^3$/m$^3$) to 1500 SCF/B (267 S m$^3$/m$^3$), or about 2200 SCF/B (392 S m$^3$/m$^3$) to 3200 SCF/B (570 S m$^3$/m$^3$).

Within the parameter ranges (T, P, WHSV, etc.) specified for Intermediate Hydroprocessing Conditions, particular hydroprocessing conditions for a particular pyrolysis tar are typically selected to (i) achieve the desired 566° C.+ conversion, typically ≥20 wt. % substantially continuously for at least ten days, and (ii) produce a TLP and hydroprocessed pyrolysis tar having the desired properties, e.g., the desired density and viscosity. The term 566° C.+ conversion means the conversion during hydroprocessing of pyrolysis tar compounds having boiling a normal boiling point ≥566° C. to compounds having boiling points <566° C. This 566° C.+ conversion includes a high rate of conversion of THs, resulting in a hydroprocessed pyrolysis tar having desirable properties.

The hydroprocessing can be carried out under Intermediate Hydroprocessing Conditions for a significantly longer duration without significant reactor fouling (e.g., as evidenced by no significant increase in reactor dP during the desired duration of hydroprocessing, such as a pressure drop of ≤140 kPa during a hydroprocessing duration of 10 days, typically ≤70 kPa, or ≤35 kPa) than is the case under substantially the same hydroprocessing conditions for a tar-fluid mixture that has not been pretreated. The duration of hydroprocessing without significantly fouling is typically least 10 times longer than would be the case for a tar-fluid mixture that has not been pretreated, e.g., ≥100 times longer, such as ≥1000 times longer.

In certain aspects, Intermediate Hydroprocessing Conditions include a $T_I$ in the range of from 320° C. to 450° C., or 340° C. to 425° C., or 340° C. to 410° C., or 375° C. to 410° C.; Pi in the range of from 1000 psi to 1600 psi, typically 1300 psi to 1500 psi; WHSV$_I$ in the range of from 0.5 to 1.5 hr$^{-1}$, typically 0.5 hr$^{-1}$ to 1.0 hr$^{-1}$, or 0.6 hr$^{-1}$ to 0.8 hr$^{-1}$, or 0.7 hr$^{-1}$ to 0.8 hr$^{-1}$; and a treat gas rate in the range of from 2000 SCF/B (~355 m$^3$/m$^3$) to 6000 SCF/B (~1070 m$^3$/m$^3$), or 2500 SCF/B (~440 m$^3$/m$^3$) to 5500 SCF/B (~980 m$^3$/m$^3$), or 3000 SCF/B (~530 m$^3$/m$^3$) to 5000 SCF/B (~900 m$^3$/m$^3$) (feed basis). Feed to the main reactor typically has a reactivity <12 BN. The weight ratio of tar:utility fluid in the feed to the main reactor is typically in the range of from 50 to 80:50 to 20, typically 60:40. Typically the intermediate hydroprocessing (hydrogenating and desulfurizing) adds from 1000 SCF/B (~178 m$^3$/m$^3$) to 2000 SCF/B (~355 m$^3$/m$^3$) of molecular hydrogen (feed basis) to the tar, and can reduce the sulfur content of the tar by ≥80 wt. %, e.g., ≥95 wt. %, or in the range of from 80 wt. % to 90 wt. %.

H: Recovering the Intermediate Hydroprocessed Pyrolysis Tar

Referring again to FIG. 2, the hydroprocessor effluent is conducted away from the main hydroprocessing reactor 100 via line 120. When the second and third preheaters (360 and 70) are heat exchangers, the hot hydroprocessor effluent in conduit 120 can be used to preheat the tar/utility fluid and the treat gas respectively by indirect heat transfer. Following this optional heat exchange, the hydroprocessor effluent is conducted to separation stage 130 for separating total vapor product (e.g., heteroatom vapor, vapor-phase cracked products, unused treat gas, etc.) and TLP from the hydroprocessor effluent. The total vapor product is conducted via line 200 to upgrading stage 220, which typically comprises, e.g., one or more amine towers. Fresh amine is conducted to stage 220 via line 230, with rich amine conducted away via line 240. Regenerated treat gas is conducted away from stage 220 via line 250, compressed in compressor 260, and conducted via lines 265, 20, and 21 for re-cycle and re-use in the main hydroprocessing reactor 100 and optionally in the second hydroprocessing reactor 500.

In aspects where the intermediate hydroprocessing is performed on a mixture including pyrolysis tar and utility fluid, the TLP from separation stage 130 typically comprises hydroprocessed pyrolysis tar, e.g., ≥10 wt. % of hydroprocessed pyrolysis tar, such as ≥50 wt. %, or ≥75 wt. %, or ≥90 wt. %. The TLP optionally contains non-tar components, e.g., hydrocarbon having a true boiling point range that is substantially the same as that of the utility fluid (e.g., unreacted utility fluid). The sulfur content of the TLP can be reduced, such as a sulfur content of 1.0 wt. % or less, or 0.5 wt. % or less, or 0.3 wt. % or less, or 0.2 wt. % or less, or 0.1 wt. % or less, such as down to 0.01 wt. % or possibly still lower. The TLP is useful as a diluent (e.g., a flux) for heavy hydrocarbons, especially those of relatively high viscosity. Optionally, all or a portion of the TLP can substitute for more expensive, conventional diluents. Non-limiting examples of blendstocks suitable for blending with the TLP and/or hydroprocessed tar include one or more of bunker fuel; burner oil; heavy fuel oil, e.g., No. 5 and No. 6 fuel oil; high-sulfur fuel oil; low-sulfur fuel oil; regular-sulfur fuel oil (RSFO); gas oil as may be obtained from the distillation of crude oil, crude oil components, and hydrocarbon derived from crude oil (e.g., coker gas oil), and the like. For example, the TLP can be used as a blending component to produce a fuel oil composition comprising <0.5 wt. % sulfur. Although the TLP is an improved product over the pyrolysis tar feed, and is a useful blendstock "as-is", it is typically beneficial to carry out further processing.

In aspects where the intermediate hydroprocessing is performed on a mixture including pyrolysis tar, flash bottoms, and utility fluid, the TLP from separation stage 130 typically comprises a mixture of hydroprocessed pyrolysis tar and hydroprocessed flash bottoms, e.g., ≥10 wt. % of hydroprocessed pyrolysis tar and hydroprocessed flash bottoms, such as ≥50 wt. %, or ≥75 wt. %, or ≥90 wt. %. The TLP optionally contains non-tar components, e.g., hydrocarbon having a true boiling point range that is substantially the same as that of the utility fluid (e.g., unreacted utility fluid). The sulfur content of the TLP can be reduced, such as a sulfur content of 1.0 wt. % or less, or 0.5 wt. % or less, or 0.3 wt. % or less, or 0.2 wt. % or less, or 0.1 wt. % or less, such as down to 0.01 wt. % or possibly still lower. The TLP is useful as a diluent (e.g., a flux) for heavy hydrocarbons, especially those of relatively high viscosity. Optionally, all or a portion of the TLP can substitute for more expensive, conventional diluents. Non-limiting examples of blendstocks suitable for blending with the TLP and/or hydroprocessed tar include one or more of bunker fuel; burner oil; heavy fuel oil, e.g., No. 5 and No. 6 fuel oil; high-sulfur fuel oil; low-sulfur fuel oil; regular-sulfur fuel oil (RSFO); gas oil as may be obtained from the distillation of crude oil, crude oil components, and hydrocarbon derived from crude oil (e.g., coker gas oil), and the like. For example, the TLP can be used as a blending component to produce a fuel oil composition comprising <0.5 wt. % sulfur. Although the TLP is an improved product over the pyrolysis tar feed and/or pyrolysis tar plus flash bottoms feed, and is a useful blendstock "as-is", it is typically beneficial to carry out further processing.

In the aspects illustrated in FIG. 2, TLP from separation stage 130 is conducted via line 270 to a further separation stage 280, e.g., for separating from the TLP one or more of hydroprocessed pyrolysis tar (or hydroprocessed pyrolysis tar plus hydroprocessed flash bottoms), additional vapor, and at least one stream suitable for use as recycle as utility fluid or a utility fluid component. Separation stage 280 may be, for example, a distillation column with side-stream draw although other conventional separation methods may be utilized. An overhead stream, a side stream and a bottoms stream, listed in order of increasing boiling point, are separated from the TLP in stage 280. The overhead stream (e.g., vapor) is conducted away from separation stage 280 via line 290. Typically, the bottoms stream conducted away via line 134 comprises ≥50 wt. % of hydroprocessed pyrolysis tar (or hydroprocessed pyrolysis tar plus hydroprocessed flash bottoms), e.g., ≥75 wt. %, such as ≥90 wt. %, or ≥99 wt. %; and typically accounts for approximately 40 wt. % of the main rector's (reactor 100) TLP, and typically about 67 wt. % of tar feed.

At least a portion of the overhead and bottoms streams may be conducted away, e.g., for storage and/or for further processing. The bottoms stream of line 134 can be desirably used as a diluent (e.g., a flux) for heavy hydrocarbon, e.g., heavy fuel oil. When desired, at least a portion of the overhead stream 290 is combined with at least a portion of the bottoms stream 134 for a further improvement in properties.

Optionally, separation stage 280 is adjusted to shift the boiling point distribution of side stream 340 so that side stream 340 has properties desired for the utility fluid, e.g., (i) a true boiling point distribution having an initial boiling point ≥177° C. (350° F.) and a final boiling point ≤566° C. (1050° F.) and/or (ii) an $S_{BN}$≥100, e.g., ≥120, such as ≥125, or ≥130. Optionally, trim molecules may be separated, for example, in a fractionator (not shown), from separation stage 280 bottoms or overhead or both and added to the side stream 340 as desired. The side stream (a mid-cut) is conducted away from separation stage 280 via conduit 340. At least a portion of the side stream 340 can be utilized as utility fluid and conducted via pump 300 and conduit 310. Typically, the side stream composition of line 310 (the mid-cut stream) is at least 10 wt. % of the utility fluid, e.g., ≥25 wt. %, such as ≥50 wt. %.

The hydroprocessed pyrolysis tar product (or hydroprocessed pyrolysis tar plus hydroprocessed flash bottoms product) from the intermediate hydroprocessing has desirable properties, e.g., a 15° C. density measured that is typically at least 0.10 g/cm³ less than the density of the thermally-treated pyrolysis tar. For example, the hydroprocessed product can have a density that is at least 0.12, or at least 0.14, or at least 0.15, or at least 0.17 g/cm³ less than the density of the pyrolysis tar composition. The hydroprocessed product's 50° C. kinematic viscosity is typically ≤1000 cSt. For example, the viscosity can be ≤500 cSt, e.g., ≤150 cSt, such as ≤100 cSt, or ≤75 cSt, or ≤50 cSt, or ≤40 cSt, or ≤30 cSt. Generally, the intermediate hydroprocessing results in a significant viscosity improvement over the pyrolysis tar conducted to the thermal treatment, the pyrolysis tar composition, and the pretreated pyrolysis tar. For example, when the 50° C. kinematic viscosity of the pyrolysis tar (e.g., obtained as feed from a tar knock-out drum) is ≥1.0×10⁴ cSt, e.g., ≥1.0×10⁵ cSt, ≥1.0×10⁶ cSt, or ≥1.0×10⁷ cSt, the 50° C. kinematic viscosity of the hydroprocessed product is typically <200 cSt, e.g., <150 cSt, preferably, <100 cSt, <75 cSt, <50 cSt, <40 cSt, or <30 cSt. Particularly when the pyrolysis tar feed to the specified thermal treatment has a sulfur content ≥1 wt. %, the hydroprocessed product typically has a sulfur content ≥0.5 wt. %, e.g., in a range of about 0.5 wt. % to about 0.8 wt. %.

J: Utility Fluid Recovery.

An advantage of the instant process is that at least part of the utility fluid can be obtained from a recycle stream. Typically 70 wt. % to 85 wt. % of the mid-cut stream from fractionator 280 is recycled as at least a portion of the utility fluid.

The amount of recycled utility fluid in the tar-containing is typically 40 wt. %, based on the weight of the tar-containing mixture, but can range from 20 wt. % to 50 wt. %, or from 30 wt. % to 45 wt. %.

Figure 6:
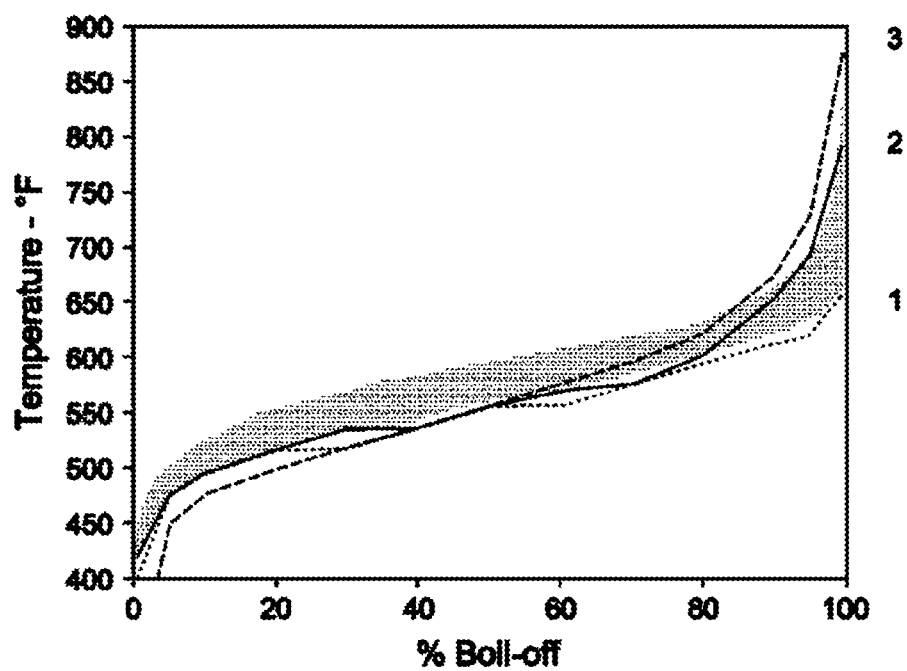
FIG. 6 compares distillation curves of mid-cut fractions resulting from three representative separations: 1—vacuum distillation, 2—commercial fractionation, 3—equilibrium flash separators.

Simulations indicate that a distillation column may be needed to recover a utility fluid having the specified $S_{BN}$. Fractionation gives a mid-cut composition that very closely resembles the desired utility fluid composition modeled by such simulations. True boiling distributions for three representative utility fluids are shown in FIG. 6.

An additional 20 wt. % or so of utility fluid (based on the total weight of utility fluid employed) is generated in each cycle, mostly as a result of conversion during hydroprocessing of the tar's fraction having a normal boiling point ≥1050° F. (566° C.). The additional utility fluid produced by the process is used to replenish any overly-hydrogenated utility fluid, which can be purged from the process together with a light stream in a distillation fractionator located downstream of the first stage main reactor. The recovered light stream comprises a major amount of 1-ring and 2-ring aromatics. In general, molecules boiling at <400° F., with the majority of the composition boiling at 350° F. About 2 kilobarrels per day (kbd) of mid-cut can be drawn from the fractionators(s). Recovered utility fluid that is not recycled to the tar upgrading process can be stored for other uses, e.g. blending into a refinery diesel stream. The light stream can also be recovered and stored or transported for other uses.

L: Retreatment Reactor to Further Reduce Sulfur.

When it is desired to further improve properties of the hydroprocessed product, e.g., by removing at least a portion of any sulfur remaining in hydroprocessed product, a further upgraded product can be produced by optional retreatment hydroprocessing. In some aspects, the further upgrading can be performed on a mixture of the hydroprocessed product and flash bottoms. Certain forms of the retreatment hydroprocessing will now be described in more detail with respect to FIG. 2. The retreatment hydroprocessing is not limited to these forms, and this description is not meant to foreclose other forms of retreatment hydroprocessing within the broader scope of the invention.

Referring again to FIG. 2, hydroprocessed product (line 134) and treat gas (line 21) are conducted to retreatment reactor 500 via line 510. Retreatment reactor 500 is typically smaller than main reactor 100. Typically, the retreatment hydroprocessing in at least one hydroprocessing zone of the intermediate reactor is carried out in the presence of a catalytically-effective amount of at least one catalyst having activity for hydrocarbon hydroprocessing. For example, the retreatment hydroprocessing can be carried out in the presence hydroprocessing catalyst(s) located in at least one catalyst bed 515. Additional catalyst beds, e.g., 516, 517, etc., may be connected in series with catalyst bed 515, optionally with intercooling, e.g., using treat gas from conduit 20, being provided between beds (not shown). The catalyst can be selected from among the same catalysts specified for use in the pretreatment hydroprocessing. A retreater effluent comprising upgraded tar is conducted away from reactor 500 via line 135.

Although the retreatment hydroprocessing can be carried out in the presence of the utility fluid, it is typical that it be carried out with little or no utility fluid to avoid undesirable utility fluid hydrogenation and cracking under Retreatment Hydroprocessing Conditions, which are typically more severe than the Intermediate Hydroprocessing Conditions. In aspects where the hydroprocessed product is mixed with flash bottoms prior to retreatment hydroprocessing, the flash bottoms can serve to modestly reduce the viscosity of the net feed for retreatment hydroprocessing. In some aspects, (i) ≥25 wt. % of liquid-phase hydrocarbon present during the retreatment hydroprocessing is hydroprocessed product obtained from line 134, such as ≥50 wt. %, ≥75 wt. %, or ≥90 wt. %, or ≥99 wt. %, and (ii) utility fluid comprises ≤50 wt. % of the balance of the liquid-phase hydrocarbon, e.g., ≤25 wt. %, such as ≤10 wt. %, or ≤1 wt. %. Additionally or alternately, in some aspects flash bottoms can correspond to ≤50 wt. % of the balance of the of liquid-phase hydrocarbon, or ≤25 wt. %, such as ≤10 wt. %, or ≤1 wt. %. In certain aspects, the liquid phase hydrocarbon present in the retreatment reactor is a hydroprocessed tar or a mixture of hydroprocessed tar and flash bottoms that is substantially-free of utility fluid. A ratio of the hydroprocessed tar to flash bottoms in the feed to retreatment hydroprocessing can be 0.5 or more, such as 0.5 to 3.0, or 0.5 to 2.0. Sulfur content of the feed to the (optional) retreatment reactor is typically 0.5 wt. % to 0.8 wt. %, or perhaps from 0.3 to 0.8 wt. %. Since this amount is well above ECA spec (0.1 wt. %), a retreatment reactor is beneficial in reducing sulfur to the ECA-specified value or less. Another advantageous feature resides in improving tar compatibility, so that the final upgraded tar product can be blended with low density, high cetane number refinery streams without precipitating solids.

Figure 3:
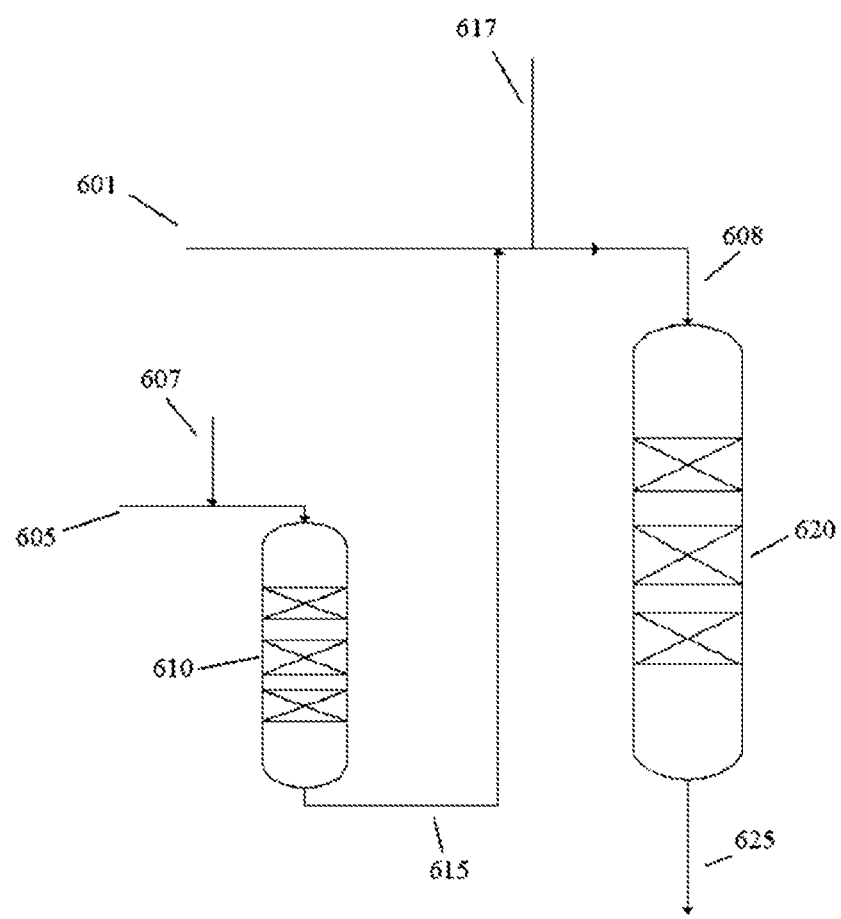
FIG. 3 shows an alternative configuration for second stage hydroprocessing of a mixed feed of hydroprocessed pyrolysis tar and pre-pyrolysis flash bottoms.

In aspects where flash bottoms are added to the hydroprocessed tar prior to retreatment, it can be beneficial to use a configuration having some of the features shown in FIG. 3. In FIG. 3, a stream 601 including hydroprocessed tar, such as stream I in FIG. 1, is combined with a (optionally demetallized) flash bottoms stream 615 to form a mixed feed 608. Due to the metals content of a pre-pyrolysis flash bottoms stream 605, a demetallization reactor or other guard reactor 610 can be used to treat pre-pyrolysis flash bottoms stream 605 as a preliminary hydroprocessing step, in the presence of hydrogen 607. The demetallized feed 615 can then be mixed with hydroprocessed tar 601 and additional hydrogen 617 for hydroprocessing in second stage hydroprocessing reactor 620. The mixed feed can be hydroprocessed under retreatment conditions to produce an upgraded effluent 625.

In various aspects, the pre-pyrolysis flash bottoms feed, optionally after combination with hydroprocessed tar, can initially be exposed to a demetallization catalyst (such as in demetallization stage 610) prior to exposing the feed to a hydrotreating catalyst (such as a second hydroprocessing stage 620). Depending on the source, flash bottoms can have metals concentrations (Ni+V+Fe) on the order of 10-100 wppm. Exposing a conventional hydrotreating catalyst to a feed having a metals content of 10 wppm or more can lead to catalyst deactivation at a faster rate than may desirable in a commercial setting. Exposing a metal containing feed to a demetallization catalyst prior to the hydrotreating catalyst can allow at least a portion of the metals to be removed by the demetallization catalyst, which can reduce or minimize the deactivation of the hydrotreating catalyst and/or other subsequent catalysts in the process flow. Commercially available demetallization catalysts can be suitable, such as large pore amorphous oxide catalysts that may optionally include Group VI and/or Group VIII non-noble metals to provide some hydrogenation activity.

Demetallization conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.8 MPag); liquid hourly space velocities (LHSV) of 0.1 $hr^{-1}$ to 10 $hr^{-1}$; and hydrogen treat rates of 100 scf/B (17.8 $m^3/m^3$) to 10,000 scf/B (1781 $m^3/m^3$), or 500 scf/B (89 $m^3/m^3$) to 10,000 scf/B (1781 $m^3/m^3$).

The Retreatment Hydroprocessing Conditions (retreatment temperature $T_R$, total pressure $P_R$, and space velocity $WHSV_R$) typically include $T_R \geq 370°$ C.; e.g., in the range of from 340° C. to 450° C., or 370° C. to 415° C., or 340° C. to 425° C.; $WHSV_R \leq 0.5$ $hr^{-1}$, e.g., in the range of from 0.2 $hr^{-1}$ to 0.5 $hr^{-1}$, or from 0.4 $hr^{-1}$ to 1.0 $hr^{-1}$; a molecular hydrogen supply rate ≥3000 SCF/B, e.g., in the range of from 3000 SCF/B (534 S $m^3/m^3$) to 6000 SCF/B (1068 S $m^3/m^3$); and $P_R \geq 6$ MPa, e.g., in the range of from 6 MPa to 13.1 MPa. Optionally, $T_R > T_I$ and/or $WHSV_R < WHSV_I$. Little or no fouling is typically observed in the retreatment reactor, mainly, it is believed, because the retreatment reactor's feed has been subjected to hydroprocessing in reactor 100. However, since most of the easy-to-remove sulfur is removed in the reactor 100, more severe run conditions are needed in in the retreatment reactor 500 in order to meet a product sulfur spec of 0.1 wt. %. When the hydroprocessed product has a sulfur content ≥0.3 wt. %, e.g., in the range of from 0.3 wt. % to 0.8 wt. %, or about 0.5 wt. %, these more severe conditions can include $T_R$ in the range of from 360° C. to 425° C., typically from 370° C. to 415° C.; PR in the range of from 1200 psi to 1600 psi, e.g., 1300 psi to 1500 psi; a treat gas rate in the range of from 3000 SCF/B to 5000 SCF/B (feed basis); $WHSV_R$ in the range of from 0.2 $hr^{-1}$ to 0.5 $hr^{-1}$. Conventional catalysts can be used, but the invention is not limited thereto, e.g., catalysts comprising one or more of Co, MO, and Ni on a refractory support, e.g., alumina and/or silica.

It is noted that in aspects where flash bottoms are added to the hydroprocessed product prior to retreatment upgrading, the flash bottoms can optionally have a sulfur content of 1.0 wt. % to 6.0 wt. %, or 2.0 wt. % to 6.0 wt. %. In such aspects, addition of the flash bottoms can increase the amount of sulfur removal that is desired in retreatment. However, at least a portion of the additional sulfur can correspond to easy-to-remove sulfur. Thus, so long as sufficient hydrogen is present, the retreatment conditions can be sufficient for removal of any additional sulfur introduced by addition of flash bottoms prior to retreatment upgrading.

The upgraded product typically has a sulfur content of 1.0 wt. % or less, or 0.5 wt. % or less, or 0.3 wt. % or less, or 0.2 wt. % or less, or 0.1 wt. % or less, such as down to 0.01 wt. % or possibly still lower. Other properties of the upgraded product include a hydrogen: carbon molar ratio ≥1.0, e.g., ≥1.05, such as ≥1.10, or ≥1.055; an $S_{BN} \geq 185$, such as ≥190, or ≥195; an $I_N \leq 105$, e.g., ≤100, such as ≤95; a 50° C. kinematic viscosity is typically ≤1000 cSt, e.g., ≤900 cSt, such as ≤800 cSt; a 15° C. density ≤1.1 $g/cm^3$, e.g., ≤1.09 $g/cm^3$, such as ≤1.08 $g/cm^3$, or ≤1.07 $g/cm^3$; a flash point ≥, or ≤−35° C. Generally, the retreating results in a significant improvement in in one or more of viscosity, $S_{BN}$, $I_N$, and density over that of the hydroprocessed tar fed to the retreater. Desirably, since the retreating can be carried out without utility fluid, these benefits can be obtained without utility fluid hydrogenation or cracking. The upgraded product can be blended with one or more blendstocks, e.g., to produce a lubricant or fuel, e.g., a transportation fuel. Suitable blendstocks include those specified for blending with the TLP and/or hydroprocessed tar.

Blending of Product Fractions

In various aspects, a portion of an intermediate hydroprocessed product and/or a portion of an upgraded product can serve as a blendstock for formation of a low sulfur fuel oil (<0.5 wt. % sulfur) and/or an ultra low sulfur fuel oil (<0.1 wt. % sulfur). Blending can be used to adjust the properties of the intermediate hydroprocessed product and/or upgraded product to achieve desired properties for a resulting fuel and/or fuel blending product. For example, an intermediate hydroprocessed product (or a portion thereof) having a sulfur content of roughly 1.0 wt. % or less can be blended with one or more other fractions to form a blended product with a lower sulfur content, such as a sulfur content of 0.5 wt. % or less. An example of a suitable fraction for blending can be a low sulfur diesel or ultra low sulfur diesel. Ultra low sulfur diesel can have a sulfur content of 50 wppm or less, or 15 wppm or less. For an intermediate hydroprocessed product/upgraded product with a sulfur content of ~1.0 wt. % or less, a roughly 50/50 blend by weight of the intermediate hydroprocessed product with ultra low sulfur diesel can result in a blended product with a sulfur content of ~0.5 wt. % or less. Similarly, for an intermediate hydroprocessed product/upgraded product with a sulfur content of ~0.2 wt. % or less, a roughly 50/50 blend by weight of the intermediate hydroprocessed product with ultra low sulfur diesel can result in a blended product with a sulfur content of ~0.1 wt. % or less.

Blending an intermediate hydroprocessed product and/or an upgraded product with other fractions can also provide improvements for other properties. For example, the cetane index for an intermediate hydroprocessed product and/or an upgraded product can be somewhat low, such as a cetane index of 10 or less, or 5 or less, as determined according to ASTM D4737. By contrast, a diesel blendstock (low sulfur diesel and/or ultra low sulfur diesel) can have substantially higher cetane index values, such as a cetane index of 45 or more, or 50 or more. Blending an intermediate hydroprocessed product and/or an upgraded product with a blendstock having a higher cetane index can result in a blended product having a cetane index of 15 or more, or 20 or more, or 25 or more, such as up to 30 or possibly still higher. Typically, a cetane index target for a low sulfur fuel oil or ultra low sulfur fuel oil can be roughly 20. Thus, blending can be used to achieve various desired fuel quality levels, such as desired sulfur amounts and/or desired cetane index values. More generally, blending with additional fractions can be used to produce a blended product having one or more desired fuel product qualities. Other potential fuel product qualities that can be of interest include, but are not limited to, density, energy density, kinematic viscosity, and aromatics content. It is noted that aromatics content can potentially be represented by another value, such as calculated carbon aromaticity index or Bureau of Mines Correlation Index (BMCI).

The intermediate hydroprocessed product and/or upgraded product may be blended with other streams including and/or not limited to any of the following, and any combination thereof, to make a low sulfur fuel oil or ultra low sulfur fuel oil: low sulfur diesel (sulfur content <500 wppm); ultra low sulfur diesel (sulfur content <10 wppm or <15 wppm); (ultra) low sulfur gas oil; (ultra) low sulfur kerosene; (hydrotreated) straight run diesel, gas oil, and/or kerosene; (hydrotreated) cycle oil, thermally cracked diesel, thermally cracked gas oil, thermally cracked kerosene, coker diesel, coker gas oil, and/or coker kerosene; hydrocracker diesel, hydrocracker gas oil, and/or hydrocracker kerosene; gas-to-liquid diesel, kerosene, wax, and/or other hydrocarbons; (hydrotreated) natural fats or oils such as vegetable oil, biomass-to-liquids diesel, and/or fatty acid alkyl esters, such as fatty acid methyl esters; and atmospheric tower bottoms, vacuum tower bottoms, and/or other residue derived from a low sulfur crude slate. Still other suitable streams can include (hydrotreated) catalytic slurry oils, other non-hydrotreated gas oil/cycle oils, (hydrotreated) deasphalted oils, lube oil aromatic extracts, slack waxes, steam cracker tar, and other fuel oil blendstocks.

Example 1—Feedstock Samples of Flash Bottoms and Steam Cracked Tar

Representative samples of steam cracked tar and pre-pyrolysis flash bottoms from a steam cracking process are obtained and characterized. Table 1 shows the bulk properties of the flash bottoms and steam cracked tar.

TABLE 1

Properties of Unfluxed Flash Bottoms and SCT

|  | Unfluxed Flash Bottoms | Unfluxed SCT |
|---|---|---|
| H (wt. %) | 10.2 | 6.5 |
| S (wt. %) | 2.6 | 4.2 |
| Density @ 15° C. (g/mL) | 0.98 | 1.11 |
| KV @ 100° C. (cSt) | 144 | 654 |
| $C_7$ asphaltene (wt. %) | 7.2 | 41 |
| $S_{BN}$ | 158 | 211 |
| $I_N$ | 101 | 126 |
| BN (g/100 g of sample) | 9.8 | 22.2 |
| Metals (wppm) |  |  |
| Na | 4 | 1.8 |
| V | 32 | 2.1 |
| Al | 2 | 0.7 |
| Si | 2 |  |

Figure 7:
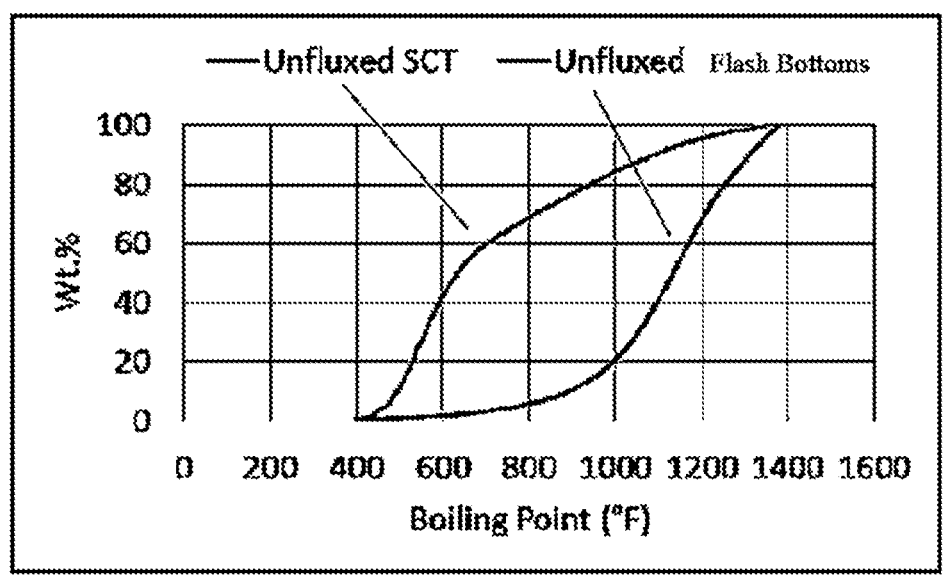
FIG. 7 shows distillation curves for representative samples of steam cracked tar and pre-pyrolysis flash bottoms.

FIG. 7 shows the boiling point distribution for the flash bottoms and SCT samples described in Table 1. As shown in FIG. 7, less than 20 wt. % of the SCT corresponds to 1050° F.+ (566° C.+) compounds, while more than 60 wt. % of the flash bottoms correspond to 566° C.+ compounds.

Example 2—Co-Upgrading of Flash Bottoms and SCT During Intermediate Hydroprocessing Based on the kinematic viscosity values at 100° C. and the solubility blending numbers shown in Table 1, both the flash bottoms sample and the steam cracked tar sample are highly viscous and aromatic. This potentially makes the flash bottoms and SCT samples suitable candidates for processing under solvent-assisted hydroprocessing conditions, such as solvent-assisted tar conversion (SATC) conditions.

To prepare for hydroprocessing, the flash bottoms sample shown in Table 1 is mixed with a steam cracked gas oil (SCGO) as a flux. The SCT sample shown in Table 1 is mixed with a mid-cut solvent derived from performing solvent-assisted tar conversion on another portion of the SCT sample as a flux. A feed for co-upgrading is then formed by mixing the fluxed flash bottoms with fluxed SCT in a ratio of 25 wt. % fluxed flash bottoms to 75 wt. % fluxed SCT. The resulting feed includes 8 wt. % SCGO flux, 17 wt. % flash bottoms, 45 wt. % SCT, and 30 wt. % mid-cut solvent. Table 2 shows the properties of the fluxed fractions and the resulting feed.

TABLE 2

Properties of Fluxed Flash Bottoms, Fluxed SCT, and Mixed Feed

|  | Fluxed Flash Bottoms | Fluxed SCT | Mixed Feed |
|---|---|---|---|
| Blended wt. % | 25 | 75 |  |
| H (wt. %) | 10.3 | 7.3 | 8.2 |
| S (wt. %) | 3.29 | 2.86 | 2.94 |
| Density @ 15° C. (g/mL) | 0.97 | 1.09 | 1.06 |
| 566° C. + (wt. %) | 43.9 | 12.5 | 19.8 |

As shown in Table 2, after addition of SCGO flux, the sulfur content of the fluxed flash bottoms is actually higher than the sulfur content of the unfluxed flash bottoms. The SCGO is a lower boiling range fraction, so the portion of 566° C.+ compounds in the fluxed flash bottoms is reduced. The density and hydrogen content of the flash bottoms are not substantially changed by the addition of the SCGO flux. For the SCT, addition of the mid-cut solvent increases the hydrogen content, reduces the sulfur content, and reduces the density. This is not surprising in view of the hydroprocessed nature of the mid-cut solvent. By combining the fluxed flash bottoms and the fluxed SCT in a ratio of 25 wt. % to 75 wt. %, the resulting mixed feed for co-upgrading had a reduced density relative to the SCT while also including 20.0 wt. % or less of 566° C.+ components.

The mixed feed shown in Table 2 is heated for several hours at 100° C. in an oven. The feed is then introduced into a fixed bed reactor filled with a CoMo/Al₂O₃ catalyst. The catalyst included 2.7 wt. % Co and 8.3 wt. % Mo relative to a total weight of the catalyst. The feed is exposed to the catalyst at hydroprocessing conditions that includes temperatures ranging from 370° C. to 390° C., a hydrogen pressure of 1200 psig (~8.2 MPa-g), a weight hourly space velocity (WHSV) of 0.8 hr$^{-1}$, and a hydrogen treat gas rate of 3000 SCF/B (~510 m³/m³). The hydroprocessing conditions are selected to study the impact of temperature on upgrading. Results from the hydroprocessing are shown in FIGS. 14-17. In FIGS. 14-17, the initial portion of the figures corresponds to a "de-edging" period for the catalyst.

Figure 9:
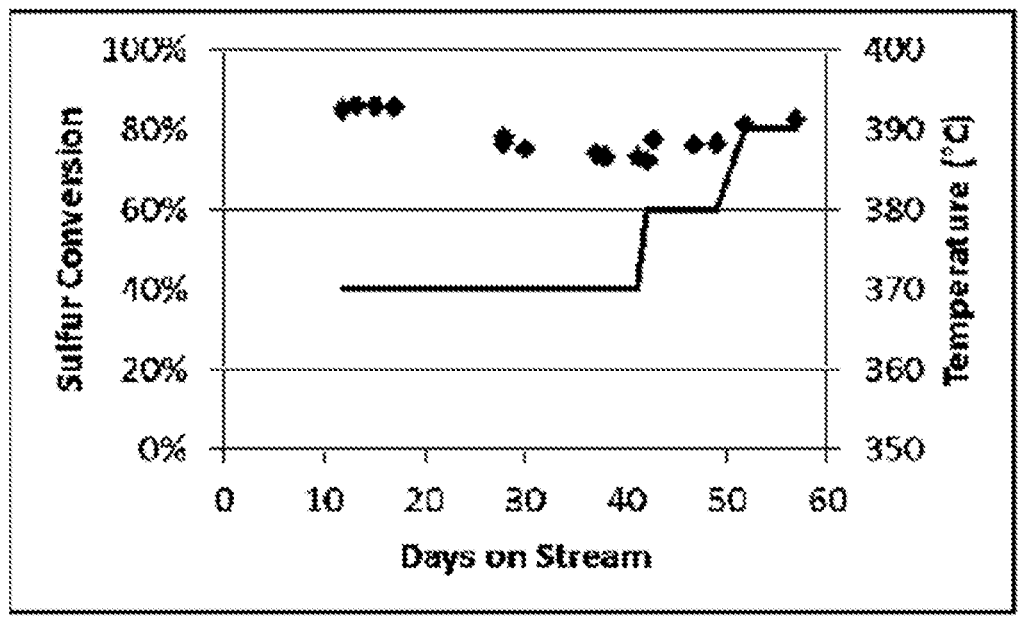
FIG. 9 shows sulfur conversion during hydroprocessing at various temperatures of a mixed feed including steam cracked tar and pre-pyrolysis flash bottoms.
Figure 10:
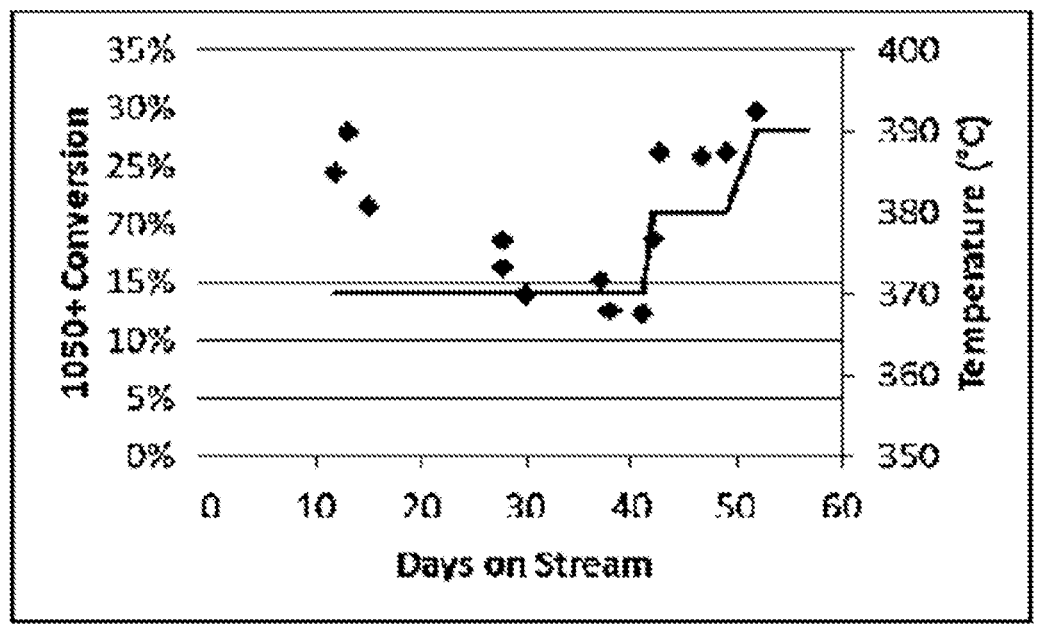
FIG. 10 shows 1050° F.+ (566° C.+) conversion during hydroprocessing at various temperatures of a mixed feed including steam cracked tar and pre-pyrolysis flash bottoms.
Figure 11:
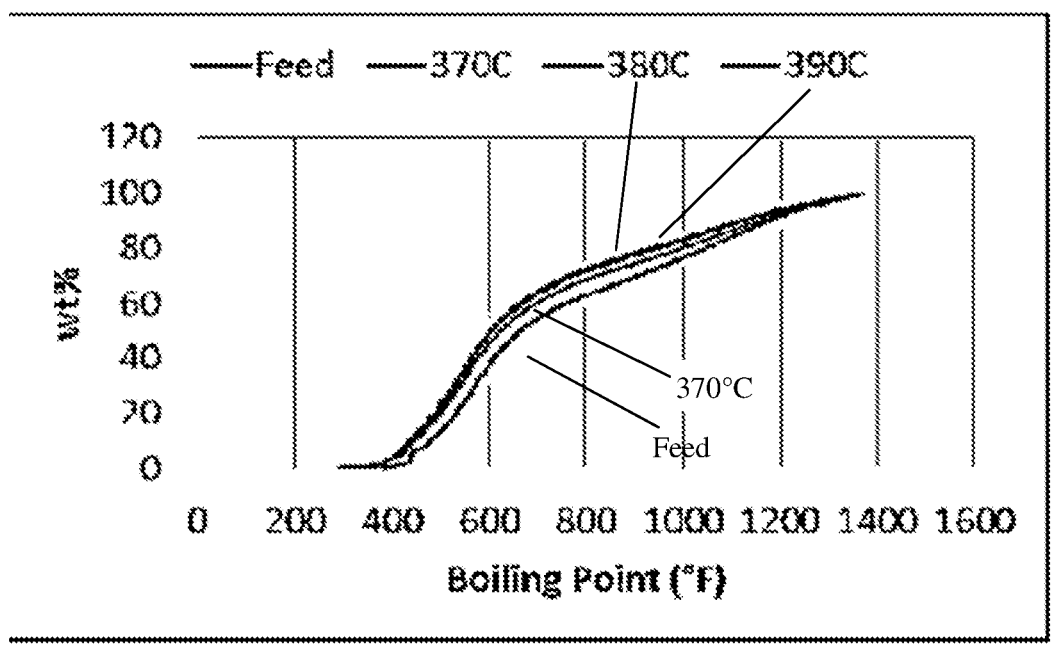
FIG. 11 shows distillation curves for total liquid products generated during hydroprocessing at various temperatures of a mixed feed including steam cracked tar and pre-pyrolysis flash bottoms.

FIG. 8 shows hydrogen consumption during the hydroprocessing. As shown in FIG. 8, the amount of hydrogen consumption changes only modestly as the temperature is increased. By contrast, FIG. 9 shows that sulfur removal increases as the temperature increases from 370° C. to 390° C. Increasing the temperature also had a substantial impact on the amount of 566° C.+ conversion, as shown in FIG. 10. Less than 15 wt. % of the 566° C.+ portion of the feed is converted at 370° C., while conversion is 25 wt. % or more for temperatures of at least 380° C. This additional conversion is also illustrated in FIG. 11, which shows the boiling point profile for the initial mixed feed and for the resulting total liquid products at 370° C., 380° C., and 390° C. As shown in FIG. 11, the initial feed has a greater percentage of higher boiling compounds. The total liquid products at 380° C. and 390° C. had overall similar boiling point profiles.

Additional results from the hydroprocessing are shown in Table 3, which includes the hydrogen content, sulfur content, density, and 566° C.+ portion for the mixed feed and the total liquid product (TLP) from hydroprocessing at 370° C., 380° C., and 390° C.

TABLE 3

Properties of Total Liquid Products

|  | Mixed Feed | TLP @ 370° C. | TLP @ 380° C. | TLP @ 380° C. |
|---|---|---|---|---|
| H (wt. %) | 8.19 | 9.59 | 9.53 | 9.62 |
| S (wt. %) | 2.94 | 0.76 | 0.70 | 0.56 |
| Density @ 15° C. (g/mL) | 1.06 | 1.00 | 1.00 | 1.00 |
| 566° C. + (wt. %) | 19.8 | 16.9 | 14.7 | 14.0 |

Based on the results shown in Table 3, it appears that at least a portion of the sulfur removal corresponds to conversion of sulfur compounds from the flash bottoms portion of the feed, as the amount of sulfur remaining in each of the total liquid products is substantially less than the amount of sulfur contained in just the SCT portion of the mixed feed. The portion of the sulfur from the flash bottoms alone would correspond to a sulfur content of more than 0.80 wt. % in the mixed feed. Without being bound by any particular theory, based on the conversion of sulfur from the flash bottoms portion of the mixed feed, it is believed that a portion of the 566° C.+ conversion for the mixed feed also corresponds to conversion of 566° C.+ compounds from the flash bottoms.

One potential concern with conversion of portions of the flash bottoms during co-upgrading is the potential for degradation of the quality of the utility fluid derived from the conversion process. When processing SCT or another type of pyrolysis tar, a utility fluid derived from a mid-cut portion can have a $S_{BN}$ of 80 or more, or 100 or more, or 110 or more. Due to the lower $S_{BN}$ values for the flash bottoms, the converted portions of the flash bottoms could potentially result in a mid-cut solvent from the hydroprocessed effluent that would have a lower $S_{BN}$ value, thus making the mid-cut solvent less suitable for use as the utility fluid. To investigate this, the total liquid products from the 370° C. and 380° C. hydroprocessing runs are distilled (in separate experiments) to form three fractions. The separation is performed to generate three fractions (light:mid-cut:bottoms) having a weight ratio of 1:5:4. This is done in an effort to make a representative mid-cut fraction that would be suitable for recycle as part of a solvent-assisted hydroprocessing process. The $S_{BN}$ of each mid-cut fraction is characterized, resulting in a $S_{BN}$ of 121 for the 370° C. mid-cut fraction and 125 for the 380° C. mid-cut fraction. This is comparable to the $S_{BN}$ for the initial mid-cut fraction that is used for the hydroprocessing, indicating little or no degradation of the potential value of the mid-cut fraction for use as a utility fluid. Thus, it is unexpectedly found that co-processing of flash bottoms with pyrolysis tar still allows for formation of a utility fluid from a mid-cut fraction with a desirable $S_{BN}$. Without being bound by any particular theory, it is believed that conversion of 566° C.+ components from the flash bottoms fraction results primarily in creation of compounds that became part of the light fraction during the 1:5:4 fractionation.

Example 3—Compatibility of Flash Bottoms with SCT

One convenient source of flash bottoms for blending with SCT prior to hydroprocessing can be flash bottoms that are formed as part of preparation of a feed for pyrolysis processing. In order to reduce or minimize non-volatile components in a pyrolysis feed, a pyrolysis processing train can include an integrated separation stage in the feed flow prior to reaching pyrolysis temperatures. This integrated separation stage can create the pyrolysis feed and a bottoms fraction that corresponds to a pre-pyrolysis flash bottoms fraction.

Table 4 shows properties of flash bottoms fractions formed when preparing a pyrolysis feed from various representative crudes.

TABLE 4

Flash Bottoms Compositions

| Crude source for flash bottoms | Aromatics | Naphthenes | Paraffins |
|---|---|---|---|
| Crude 1 | 74.10 | 18.84 | 7.06 |
| Crude 2 | 82.05 | 13.05 | 4.90 |
| Crude 3 | 77.28 | 16.97 | 5.60 |
| Crude 4 | 66.63 | 23.83 | 7.48 |
| Crude 5 | 82.77 | 12.00 | 5.24 |
| Crude 6 | 80.92 | 12.43 | 6.66 |
| Crude 7 | 84.98 | 9.51 | 5.51 |
| Crude 8 | 77.37 | 16.25 | 6.38 |
| 70% Crude 1/ 30% Crude 2 | 77.11 | 16.61 | 6.29 |

The final row in Table 4 corresponds to a blend of flash bottoms from Crude 1 (70 wt. %) and Crude 2 (30 wt. %). This blend of flash bottoms has a composition that roughly corresponds to an average of the flash bottoms compositions in Table 4. This blend is used as a representative blend for further investigation of the compatibility of flash bottoms with SCT for co-processing.

To further investigate compatibility, various weight ratios of the flash bottoms blend and a representative steam cracked tar (SCT) are heated to 100° C. and then mixed together. A commercially available aromatic fluid (ExxonMobil Solvesso A200) is used as a suitable replacement for a mid-cut solvent. The amount of aromatic fluid correspond to roughly 40 wt. % of the total blend of flash bottoms, SCT, and solvent. The mixture of flash bottoms, SCT, and solvent are then stored at 100° C. for 20 minutes. The For the flash bottoms fractions shown in Table 4, the flash bottoms are highly aromatic. As a result, the $S_{BN}$ values for the flash bottoms fractions are relatively high, and precipitation of asphaltenes is of lower concern. Instead, the precipitation concerns for the flash bottoms in Table 4 are related to the wax contents of the flash bottoms. A temperature staging microscope is then used to characterize the temperature where insolubles appear and the temperature range where the mixtures appear to be fully soluble. The results from the solubility investigation are shown in Table 5.

TABLE 5

Compatibility of SCT and Flash Bottoms

| SCT (wt. %) | A200 (solvent) | Flash Bottoms Blend (wt. %) | Temperature when full soluble (range, ° C.) | Cool down T for insolubility (° C.) |
|---|---|---|---|---|
| 10 | 40 | 50 | 65-73 | 40 |
| 20 | 40 | 40 | 60-67 | 35 |
| 30 | 40 | 30 | 55-60 | 31 |
| 40 | 40 | 20 | 45-52 | 24 |
| 50 | 40 | 10 | 15-20 | 15 |

As shown in Table 5, combining a representative SCT with a representative flash bottoms blend in the presence of 40 wt % of an aromatic solvent results in compatible samples at all of the ratios of SCT to flash bottoms that are investigated. When insoluble material appeared, the insoluble material corresponds to paraffinic material, and not asphaltenes. It is noted that the various flash bottoms in Table 4 all correspond to fractions with relatively low paraffin content. As a result, all of the flash bottoms in Table 4, including the blend used in Table 5, had a relatively high $S_{BN}$. In combination with the aromatic solvent, this allows asphaltenes to remain in solution. However, as the amount of flash bottoms in the mixture is increased, the temperature at which paraffinic molecules would precipitate increased. The precipitation temperatures are well below any reaction temperatures for processing of SCT with flash bottoms. One potential process modification based on the data in Table 6 could be to heat conduit lines between reactors, so that the temperature of a mixture of SCT and flash bottoms remains above 80° C., or above 100° C., in between processing steps.

The description in this application is intended to be illustrative and not limiting of the invention. One in the skill of the art will recognize that variation in materials and methods used in the invention and variation of embodiments of the invention described herein are possible without departing from the invention. It is to be understood that some embodiments of the invention might not exhibit all of the advantages of the invention or achieve every object of the invention. The scope of the invention is defined solely by the claims following.

The invention claimed is:

1. A process for preparing a low sulfur liquid hydrocarbon product comprising:
   i) blending a first process stream comprising a tar stream with a utility fluid to reduce the viscosity of the first process stream and obtain a second process stream comprising reduced reactivity, lower viscosity tar;
   ii) removing solids from the second process stream to provide a third process stream comprising a reduced reactivity, lower viscosity tar that is substantially free of solids of size larger than 25 μm;
   iii) pretreating the third process stream to further lower the reactivity of the reduced reactivity, lower viscosity tar and obtain a fourth process tar stream;
   iv) mixing a pre-pyrolysis flash bottoms stream with at least one of the first process stream, the second process stream, the third process stream, and the fourth process stream to form a mixed stream comprising 10 wt. % or more of the flash bottoms stream, a weight ratio of the flash bottoms stream to the tar stream being 1.5 or less, the pre-pyrolysis flash bottoms stream having a T5 distillation point of 400° C. or more;
   v) hydrogenating and desulfurizing the fourth process stream and recovering a total liquid product (TLP);
   vi) distilling the TLP and recovering a mid-cut of the distillation products and a heavy bottoms fraction, the mid-cut of the distillation products having a $S_{BN}$ of 100 or more; and
   vii) desulfurizing the heavy bottoms fraction to obtain a low sulfur product having a sulfur content of 1.0 wt. % or less.

2. The process of claim 1, further comprising:
   separating a lower boiling fraction and a first bottoms fraction from a feedstock, the lower boiling fraction having a T95 distillation point of 455° C. or less, the first bottoms fraction comprising the pre-pyrolysis flash bottoms stream; and
   performing pyrolysis on at least a portion of the lower boiling fraction to form at least a pyrolysis tar product, the pyrolysis tar product comprising the tar stream.

3. The process of claim 1, wherein the pre-pyrolysis flash bottoms stream has a $S_{BN}$ of 80 or more; or wherein the pre-pyrolysis flash bottoms stream further comprises a flash bottoms solvent; or wherein the weight ratio of the flash bottoms stream to the tar stream is 1.5 or less; or a combination thereof.

4. The process of claim 1, further comprising recycling a portion of the mid-cut as at least a portion of the utility fluid used in step i), the mid-cut optionally having a $S_{BN}$ of 80 or more.

5. The process of claim 1, further comprising heat soaking the tar stream prior to blending the first process stream with the utility fluid, wherein the heat soaking step is performed at a temperature in the range of from 200° C. to 300° C., and for a time in the range of from 2 minutes to 30 minutes.

6. The process of claim 1, wherein the hydrogenating and desulfurizing step v) adds from 1000 SCF/B to 2000 SCF/B of molecular hydrogen on a feed basis to the fourth process stream and reduces sulfur content of the fourth process stream by 80 wt. % to 95 wt. %; or wherein the hydrogenating and desulfurizing step v) is performed at a temperature in the range of from 340° C. to 410° C. and a space velocity (WHSV, feed basis) in the range of from 0.5 hr$^{-1}$ to 1.5 hr$^{-1}$; or a combination thereof.

7. The process of claim 1, wherein the heavy bottoms desulfurizing step vii) provides a product having a sulfur content of 0.2 wt. % or less.

8. The process of claim 1, further comprising passing the product of step ii) through a guard reactor that further removes reactive olefins and residual solids before step iii), the guard reactor being operated at a temperature in the range of from 240° C. to 320° C. and a space velocity (WHSV, feed basis) in the range of from 2 hr$^{-1}$ to 10 hr$^{-1}$.

9. The process of claim 8, wherein the flash bottoms stream is mixed with at least one of the first process stream, the second process stream, and the third process stream.

10. The process of claim 8, wherein at least one of the catalysts of step v) contains one or more of Co, Ni, or Mo; or wherein at least one of the catalysts in the guard reactor contains one or more of Co, Ni, or Mo; or wherein the desulfurizing step vii) is performed in a reactor packed with a catalyst that contains one or more of Co, Ni, or Mo; or a combination thereof.

11. The process of claim 1, wherein the pretreating step (iii) is performed at a temperature in the range of from 260° C. to 300° C. and a feed weight hourly space velocity (WHSV) in the range of from of 1.0 hr$^{-1}$ to 4.0 hr$^{-1}$.

12. The process of claim 1, further comprising blending the low sulfur product with one or more additional fractions to produce an ECA stream that includes the low sulfur product, a low sulfur fuel oil stream that includes the low sulfur product, or a combination thereof.

13. A process for preparing a low sulfur liquid hydrocarbon product comprising:
i) blending a first process stream with a utility fluid to reduce the viscosity of the first process stream and obtain a second process stream comprising reduced reactivity, lower viscosity tar;
ii) removing solids from the second process stream to provide a third process stream comprising a reduced reactivity, lower viscosity tar that is substantially free of solids of size larger than 25 µm;
iii) pretreating the third process stream to further lower the reactivity of the tar and obtain a fourth process tar stream;
iv) hydrogenating and desulfurizing the fourth process stream and recovering a total liquid product (TLP);
v) distilling the TLP and recovering a mid-cut of the distillation products and a heavy bottoms fraction;
vi) mixing at least a portion of the heavy bottoms fraction with a pre-pyrolysis flash bottoms stream to form a mixed feed comprising 25 wt. % or more of the heavy bottoms fraction and having a weight ratio of heavy bottoms fraction to pre-pyrolysis flash bottoms stream of 0.5 or more, the pre-pyrolysis flash bottoms stream having a T5 distillation point of 400° C. or more; and
vii) desulfurizing the mixed feed to obtain a low sulfur product having a sulfur content of about 1.0 wt. % or less.

14. The process of claim 13, further comprising:
separating a lower boiling fraction and a first bottoms fraction from a feedstock, the lower boiling fraction having a T95 distillation point of 455° C. or less, the first bottoms fraction comprising the pre-pyrolysis flash bottoms stream; and
performing pyrolysis on at least a portion of the lower boiling fraction to form at least a pyrolysis tar product, the pyrolysis tar product comprising the tar stream.

15. The process of claim 13, wherein the pre-pyrolysis flash bottoms stream has a $S_{BN}$ of 80 or more; or wherein the pre-pyrolysis flash bottoms stream further comprises a flash bottoms solvent; or a combination thereof.

16. The process of claim 13, further comprising blending the low sulfur product with one or more additional fractions to produce an ECA stream that includes the low sulfur product, a low sulfur fuel oil stream that includes the low sulfur product, or a combination thereof.

17. The process of claim 13, further comprising heat soaking the first process stream prior to blending the first process stream with the utility fluid, wherein the heat soaking step is performed at a temperature in the range of from 200° C. to 300° C., and for a time in the range of from 2 minutes to 30 minutes.

18. The process of claim 13, wherein the solids removal step ii) includes centrifugation.

19. The process of claim 13, further comprising passing the product of the step ii) through a guard reactor that further removes reactive olefins and residual solids before step iii), the guard reactor being operated at a temperature in the range of from 240° C. to 320° C. and a space velocity (WHSV, feed basis) in the range of from 2.0 hr$^{-1}$ to 10 hr$^{-1}$.

20. The process of claim 13, further comprising recycling a portion of the mid-cut as at least a portion of the utility fluid used in step i), and wherein 70 wt. % to 85 wt. % of the recycled mid-cut is included in the utility fluid.

21. The process of claim 13, wherein the pretreatment step (iii) is performed at a temperature in the range of from 260° C. to 300° C. and a feed weight hourly space velocity (WHSV) in the range of from of 1.0 hr$^{-1}$ to 4.0 hr$^{-1}$.

22. The process of claim 13, wherein the hydrogenating and desulfurizing step v) adds from 1000 SCF/B to 2000 SCF/B of molecular hydrogen on a feed basis to the fourth process stream and reduces sulfur content of the fourth process stream by 50 wt. % to 95 wt. %; or wherein the hydrogenating and desulfurizing step iv) is performed at a temperature in the range of from 340° C. to 410° C. and a space velocity (WHSV, feed basis) in the range of from 0.5 hr$^{-1}$ to 1.5 hr$^{-1}$; or a combination thereof.

23. The process of claim 13, wherein the desulfurizing step vii) is performed at a temperature in the range of from 340° C. to 425° C. and a space velocity (WHSV, feed basis) in the range of from 0.4 hr$^{-1}$ to 1.0 hr$^{-1}$.

24. The process of claim 23, wherein at least one of the catalysts of step v) contains one or more of Co, Ni, or Mo;

or wherein the desulfurizing step vii) is performed in a reactor packed with a catalyst that contains one or more of Co, Ni, or Mo; or a combination thereof.

25. The process of claim 13, further comprising demetallization of the pre-pyrolysis flash bottoms prior to mixing the pre-pyrolysis flash bottoms with the at least a portion of the heavy bottoms fraction.

26. A system for producing a low sulfur liquid product, comprising:
- a flash separator having a feed inlet, a lower boiling stream outlet, and a flash bottoms outlet;
- a steam cracker comprising a steam cracker inlet and a steam cracker outlet, the steam cracker inlet being in fluid communication with the lower boiling stream outlet;
- a first fractionation stage comprising a first fractionation inlet, one or more first product outlets, and a tar outlet, the first fractionation inlet being in fluid communication with the steam cracker outlet;
- at least one of a heat soaking vessel and a heat soaking conduit;
- a particle separator comprising a particle separator inlet and a particle separator outlet, the particle separator inlet being in fluid communication with the tar outlet via the at least one heat soaking vessel and heat soaking conduit;
- one or more first hydroprocessing reactors comprising a first hydroprocessor inlet and a first hydroprocessor outlet, the first hydroprocessor inlet being in fluid communication with the particle separator outlet;
- a second fractionation stage comprising a second fractionation inlet, one or more light products outlets, the mid-cut outlet, and a hydroprocessed bottoms outlet, the second fractionation inlet being in fluid communication with the hydroprocessor outlet; and
- one or more second hydroprocessing reactors comprising a second hydroprocessor inlet and a second hydroprocessor outlet, the second hydroprocessor inlet being in fluid communication with the hydroprocessed bottoms outlet, wherein at least one of the particle separator inlet and the first hydroprocessor inlet is further in fluid communication with the flash bottoms outlet, and wherein at least one of the particle separator inlet and the first hydroprocessor inlet is further in fluid communication with the mid-cut outlet.

27. A system for producing a low sulfur liquid product, comprising:
- a flash separator having a feed inlet, a lower boiling stream outlet, and a flash bottoms outlet;
- a steam cracker comprising a steam cracker inlet and a steam cracker outlet, the steam cracker inlet being in fluid communication with the lower boiling stream outlet;
- a first fractionation stage comprising a first fractionation inlet, one or more first product outlets, and a tar outlet, the first fractionation inlet being in fluid communication with the steam cracker outlet;
- at least one of a heat soaking vessel and a heat soaking conduit;
- a particle separator comprising a particle separator inlet and a particle separator outlet, the particle separator inlet being in fluid communication with the tar outlet via the at least one heat soaking vessel and heat soaking conduit;
- one or more first hydroprocessing reactors comprising a first hydroprocessor inlet and a first hydroprocessor outlet, the first hydroprocessor inlet being in fluid communication with the particle separator outlet;
- a second fractionation stage comprising a second fractionation inlet, one or more light products outlets, the mid-cut outlet, and a hydroprocessed bottoms outlet, the second fractionation inlet being in fluid communication with the hydroprocessor outlet; and
- one or more second hydroprocessing reactors comprising a second hydroprocessor inlet and a second hydroprocessor outlet, the second hydroprocessor inlet being in fluid communication with the hydroprocessed bottoms outlet and being in fluid communication with the flash bottoms outlet, wherein at least one of the particle separator inlet and the first hydroprocessor inlet is further in fluid communication with the mid-cut outlet.

28. The system of claim 27, further comprising a demetallization reactor, the fluid communication between the second hydroprocessor inlet and the flash bottoms outlet comprising indirect fluid communication via the demetallization reactor.

* * * * *